US012728769B2

(12) United States Patent
Kim et al.

(10) Patent No.: US 12,728,769 B2
(45) Date of Patent: Sep. 8, 2026

(54) SEAT MOUNTING DEVICE FOR VEHICLE

(71) Applicants: Hyundai Motor Company, Seoul (KR); Kia Corporation, Seoul (KR); Daewon Precision Industrial Co., Ltd., Ansan (KR)

(72) Inventors: Seung Hyun Kim, Daejeon (KR); Hyeong Jong Kim, Seoul (KR); Byeong Seon Son, Seoul (KR); Byung Yong Choi, Hwaseong (KR); Dong Woo Jeong, Gwacheon (KR); Seok Hwan Kim, Suwon (KR); Yun Ho Shin, Cheonan (KR)

(73) Assignees: Hyundai Motor Company, Seoul (KR); Kia Corporation, Seoul (KR); Daewon Precision Industrial Co., Ltd., Ansan (KR)

( * ) Notice: Subject to any disclaimer, the term of this patent is extended or adjusted under 35 U.S.C. 154(b) by 323 days.

(21) Appl. No.: 18/637,178

(22) Filed: Apr. 16, 2024

(65) Prior Publication Data

US 2025/0121741 A1 Apr. 17, 2025

(30) Foreign Application Priority Data

Oct. 11, 2023 (KR) ........................ 10-2023-0134895

(51) Int. Cl.
*B60N 2/015* (2006.01)

(52) U.S. Cl.
CPC ................................ *B60N 2/01541* (2013.01)

(58) Field of Classification Search
None
See application file for complete search history.

(56) References Cited

U.S. PATENT DOCUMENTS

| | | | | |
|---|---|---|---|---|
| 6,106,066 A * | 8/2000 | Moffa | B60N 2/3043 | 297/332 |
| 6,843,526 B2 * | 1/2005 | Honda | B60N 2/3011 | 297/14 |
| 7,393,038 B2 * | 7/2008 | Yajima | B60N 2/01583 | 296/64 |
| 7,823,970 B2 * | 11/2010 | Okuda | B60N 2/42709 | 296/68.1 |
| 8,215,695 B2 * | 7/2012 | Ida | B60N 2/01583 | 297/316 |
| 8,336,942 B2 * | 12/2012 | Yamashita | B60N 2/0155 | 296/65.03 |
| 8,562,060 B2 * | 10/2013 | Kato | B60N 2/3043 | 296/65.09 |

(Continued)

FOREIGN PATENT DOCUMENTS

| | | | |
|---|---|---|---|
| JP | 3651136 B2 * | 5/2005 | B60N 2/01583 |
| JP | 2014162342 A * | 9/2014 | |

*Primary Examiner* — Aaron L Lembo

(74) *Attorney, Agent, or Firm* — Fox Rothschild LLP

(57) ABSTRACT

A seat mounting device for a vehicle is configured to allow a seat to be removably mounted in a flexible manner according to a user's desired purpose by mounting the seat to face forward or rearward or arranging the seat along with other seats of the vehicle, according to the number of passengers or different seating arrangements. In addition, by allowing the seat to be removed from the leg frame and the leg frame to be removed from the support frame and folded, the seat and leg frame may be easily stored in a separate storage location.

20 Claims, 24 Drawing Sheets

(56) References Cited

U.S. PATENT DOCUMENTS

| | | | | |
|---|---|---|---|---|
| 9,033,422 | B2 * | 5/2015 | Miyazawa | B60N 2/688 297/331 |
| 10,485,717 | B2 * | 11/2019 | Moss | B60N 2/859 |
| 10,723,242 | B2 * | 7/2020 | De Rico Herrero | B60N 2/0276 |
| 11,554,695 | B2 * | 1/2023 | Whalen | B60N 2/01583 |
| 2018/0326871 | A1 * | 11/2018 | Jackson | B60N 2/0292 |

* cited by examiner

SEAT MOUNTING DEVICE FOR VEHICLE

CROSS REFERENCE TO RELATED APPLICATION

This application claims under 35 U.S.C. § 119(a) the benefit of Korean Patent Application No. 10-2023-0134895, filed Oct. 11, 2023, the entire contents of which are incorporated by reference herein.

BACKGROUND

(a) Technical Field

The present disclosure relates to a seat mounting device for a vehicle, more specifically, to the seat mounting device configured to allow a seat to be removably mounted in the vehicle in a flexible arrangement.

(b) Description of the Related Art

In general, seats for a vehicle are manufactured with a structure that includes a seat cushion for seating a passenger's lower body, a seat back for leaning an upper body, a headrest to support a neck and a head, and the like. In addition, various mechanisms for adjusting the seat position are being applied to the seats so that a seat position change, which is fitted to a passenger's body type and situation, may be freely implemented.

In particular, a purpose built vehicle (PBV), a type of multi-passenger vehicle and self-driving vehicle, is manufactured for various purposes such as living and resting spaces, mobile warehouses, logistics delivery mobility, mobile hospitals, food trucks, and the like. In this regard, there is a need for a method to easily adjust the arrangement of seats mounted in a vehicle to suit a user's desired purpose.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a seat mounting device for a vehicle that may improve space utilization within a vehicle, the seat mounting device allowing the seat to be removably mounted in the vehicle in a flexible arrangement suited to a user's desired purpose.

In order to achieve the above objective, according to one aspect of the present disclosure, there may be provided a seat mounting device for a vehicle, the seat mounting device including: a plurality of seat latches (e.g., mounted on a bottom of a seat cushion frame); a support frame having side strikers respectively mounted on opposite sides and at least two lower strikers, and which may be mounted on a vehicle body of the vehicle; a leg frame including: an upper leg frame having a side latch, which is detachably fastened to the side striker, the leg frame including upper strikers, to which the seat latches are detachably fastened, and a connection striker mounted to the leg frame; a support shaft mounted on the upper leg frame; and a lower leg frame rotatably mounted on the support shaft; and a pair of lower latches mounted on the lower leg frame and configured to be detachably fastened to the lower strikers, respectively.

The support shaft may be mounted with a pair of center strikers for mounting a center seat.

The lower leg frame may include: a pair of vertical frames rotatably fastened to the support shaft; and a horizontal frame provided in a structure mounted with the pair of lower latches and configured to be connected between the pair of vertical frames.

The upper leg frame and the lower leg frame may be mounted with a folding device configured to allow the lower leg frame to be unfolded in a vertical direction or to be folded in a horizontal direction.

The folding device may include: a pair of support plates, each of which is configured to be a plate body structure provided with an upper locking hole and a lower locking hole and is mounted on the upper leg frame so as to allow one of opposite ends of the support shaft to be fixed correspondingly; a locking block provided with a locking pin, which is configured to be inserted into and fastened to one of the upper locking hole and the lower locking hole; and a folding lever including: an upper-end provided with an unlocking end configured to be fastened to the connection groove of the locking block; a middle structure configured to be hinge fastened to the lower leg frame by a hinge pin; and a lower-end structure that is exposed to the outside to allow an operation to pull.

Between the middle structure of the folding lever and the hinge pin, a return spring, which is configured to exert an elastic restoring force in a reverse direction of pulling the folding lever, may be mounted.

In a position where the lower leg frame is folded, the locking pin of the locking block may be inserted into the upper locking hole, and in a position where the lower leg frame is unfolded, the locking pin of the locking block may be inserted into the lower locking hole.

When the lower-end structure of the folding lever is pulled outward so that the lower leg frame may be rotated to the unfolded or folded position, the unlocking end may pull the locking block in a rearward direction, and at the same time, the locking pin may be separated from the upper locking hole or the lower locking hole.

The folding device may further include: a pair of guide brackets, each being provided in a structure with a guide hole and mounted on a lower surface of the upper leg frame correspondingly; a guide pipe with opposite ends, each of which is configured to be slidably inserted into the guide hole of a corresponding one of guide brackets; and a pair of guide links, each of which has one end that is configured to be connected to a corresponding one of the opposite ends of the guide pipe and an opposite end that is configured to be hinge fastened to an inner surface of a corresponding one of the vertical frames of the lower leg frame.

A locking device for supporting and fixing the support shaft may be mounted on the horizontal frame of the lower leg frame and the support shaft.

The locking device may include: a fixing bracket mounted on the support shaft; a fixing pin mounted on the fixing bracket; a locking bracket mounted on the horizontal frame; and a locking latch mounted on the locking bracket and locked and fastened to the fixing pin.

A first operating lever and a second operating lever may be connected to the pair of lower latches, respectively, and a lower latch release lever, while being hinge fastened to each of inner side ends of the first operating lever and the second operating lever, may be hinge fastened to the horizontal frame of the lower leg frame.

The inner side ends of the first operating lever and the second operating lever may be respectively hinge fastened to an upper point and a lower point, which are at equal distances from a hinge point at which the lower end of the lower latch release lever is hinge fastened to the horizontal frame.

The side latch, which is detachably fastened to the side striker of the support frame, may be mounted in an open-bottom latch bracket mounted on the one side of the upper leg frame.

The support frame may be mounted with gap prevention brackets that are configured to be fastened to opposite ends of the side striker, and at the same time when the side latch is fastened to the side striker, opposite side surfaces of the latch bracket may respectively come into close contact with inner surfaces of the gap prevention brackets.

A vehicle may include the seat mounting device.

As described above, by solving the above problems, the present disclosure provides the following effects.

First, the seat can be removably mounted in a vehicle in an arrangement suited to the user's desired purpose, such as mounting the seat to face forward or rearward, thereby improving space utilization within the vehicle.

For example, seats can be easily mounted and removed in an arrangement that is suited to a user's desired space utilization purpose within multi-passenger vehicles and purpose built vehicles (PBV).

Second, the seats can be arranged in independent seats, two-seater seats, three-seater seats, or the like, whereby the convenience of adjusting the number of seats mounted can be provided depending on the number of passengers.

Third, the seats are allowed to be removed from a leg frame, and the leg frame is allowed to be removed from a support frame to be folded, whereby the seat and leg frame can be easily stored in a separate storage location so as to secure a large interior loading space in the vehicle.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
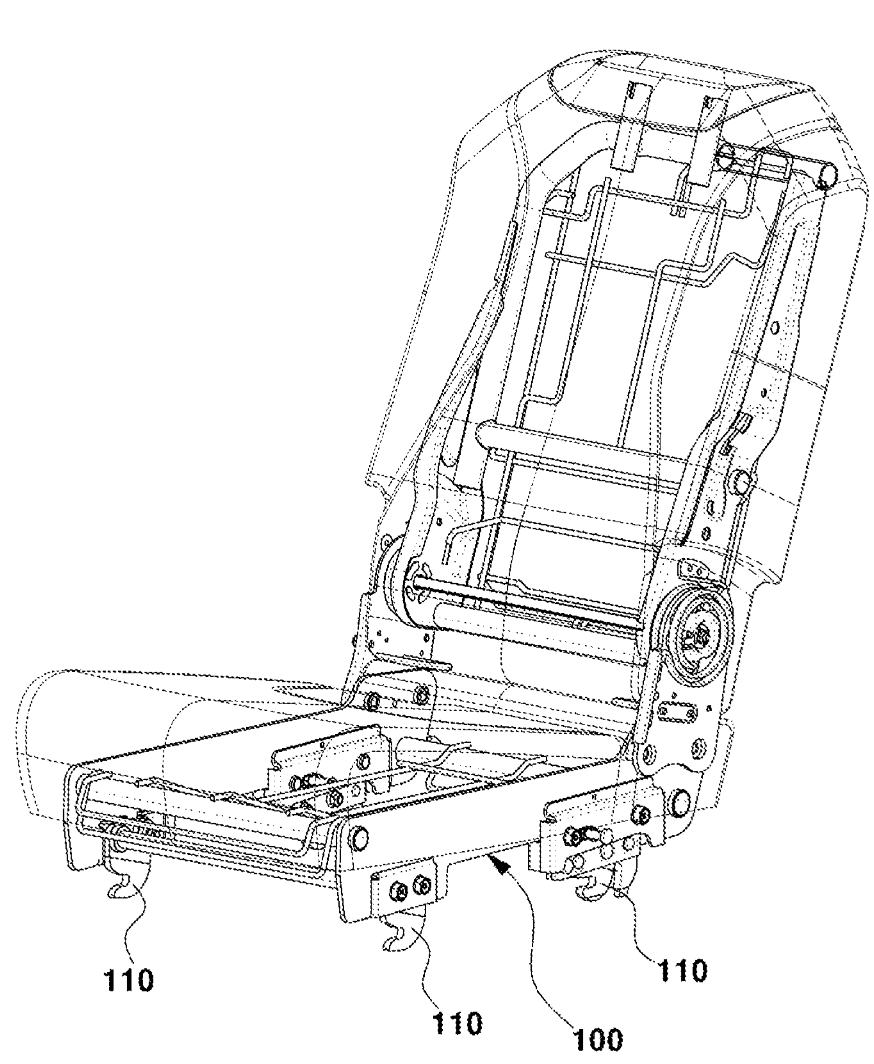
FIG. 1 is a perspective view showing a state in which a seat latch is mounted on a seat cushion frame among configurations of a seat mounting device for a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural to functional descriptions described in the embodiments of the present specification are merely exemplified for the purpose of explaining embodiments according to a concept of the present disclosure, and the embodiments according to the concept of the present disclosure may be implemented in various forms. In addition, the invention should not be construed to be limited by the embodiments described in the present specification and should be understood to include all modifications, equivalents, or substitutes included in the spirit and technical scope thereof.

In the present disclosure, terms such as first and/or second may be used to describe various components, but the components are not limited by the terms. The above terms are used only for the purpose of distinguishing one component from other components, and for example, within a range not departing from the scope of rights according to the concept of the present disclosure, a first component may be referred to as a second component, and similarly, the second component may also be referred to as the first component.

It should be understood that when a component is referred to as being "coupled" or "connected" to another component in the present disclosure, it may be directly coupled or connected to another component, but other components may even exist in the middle. On the other hand, when a component is referred to as being "directly coupled" or "directly connected" to another component, it should be understood that no other component exists in the middle. Other expressions used to describe the relationship between each component, such as "between" and "directly between" or "adjacent to" and "directly adjacent to", should be interpreted similarly.

Like reference numbers indicate like elements throughout the present specification. Terms used in the present specification are for describing the embodiments and are not intended to limit the present disclosure. In the present specification, a singular form also includes a plural form unless specifically stated in a phrase.

Hereinbelow, exemplary embodiments of the present disclosure will be described in detail with reference to the accompanying drawings.

Figure 2:
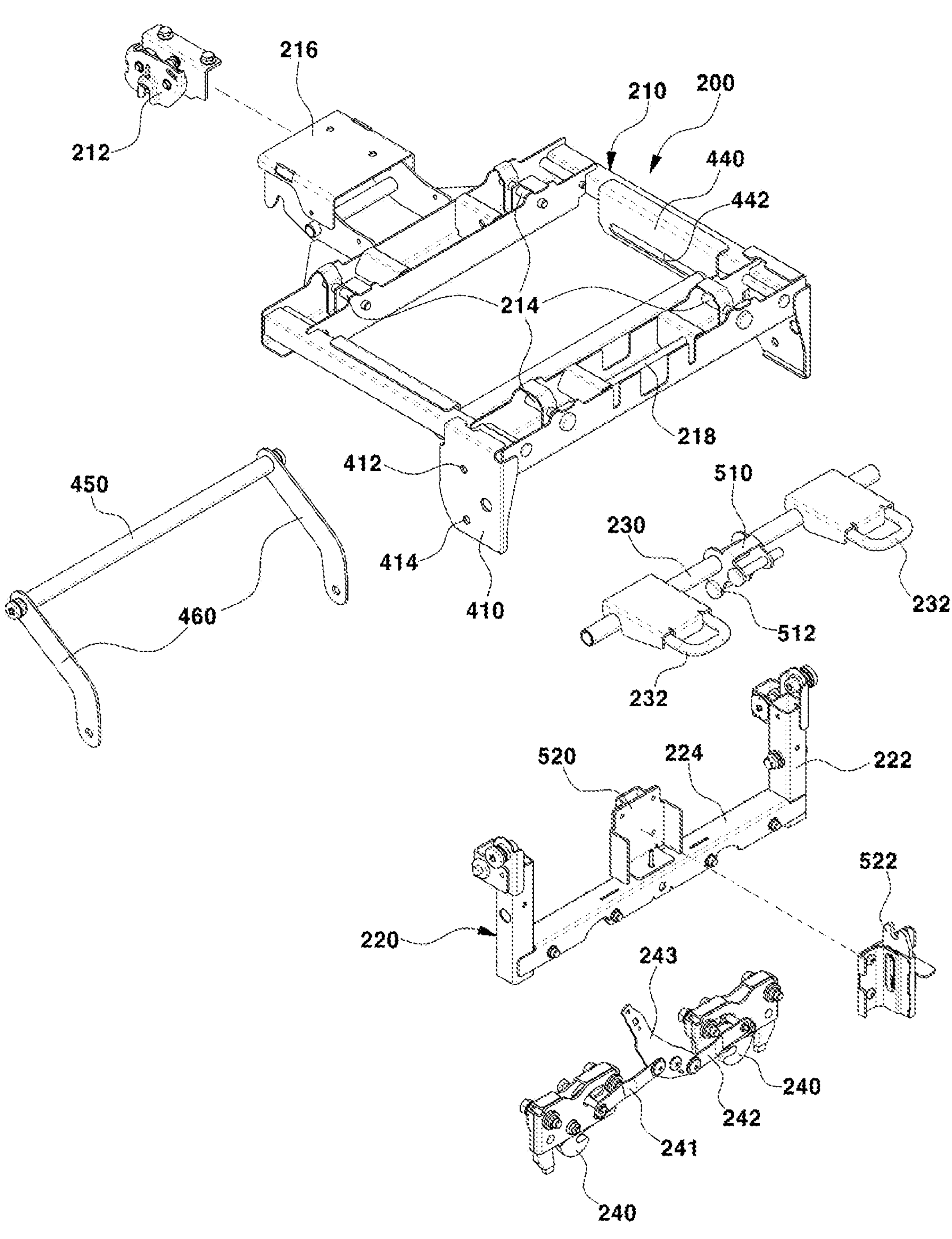
FIG. 2 is a perspective view showing a state in which a leg frame, a lower latch, and the like are separated from each other among the configurations of the seat mounting device for a vehicle according to the present disclosure.
Figure 3:
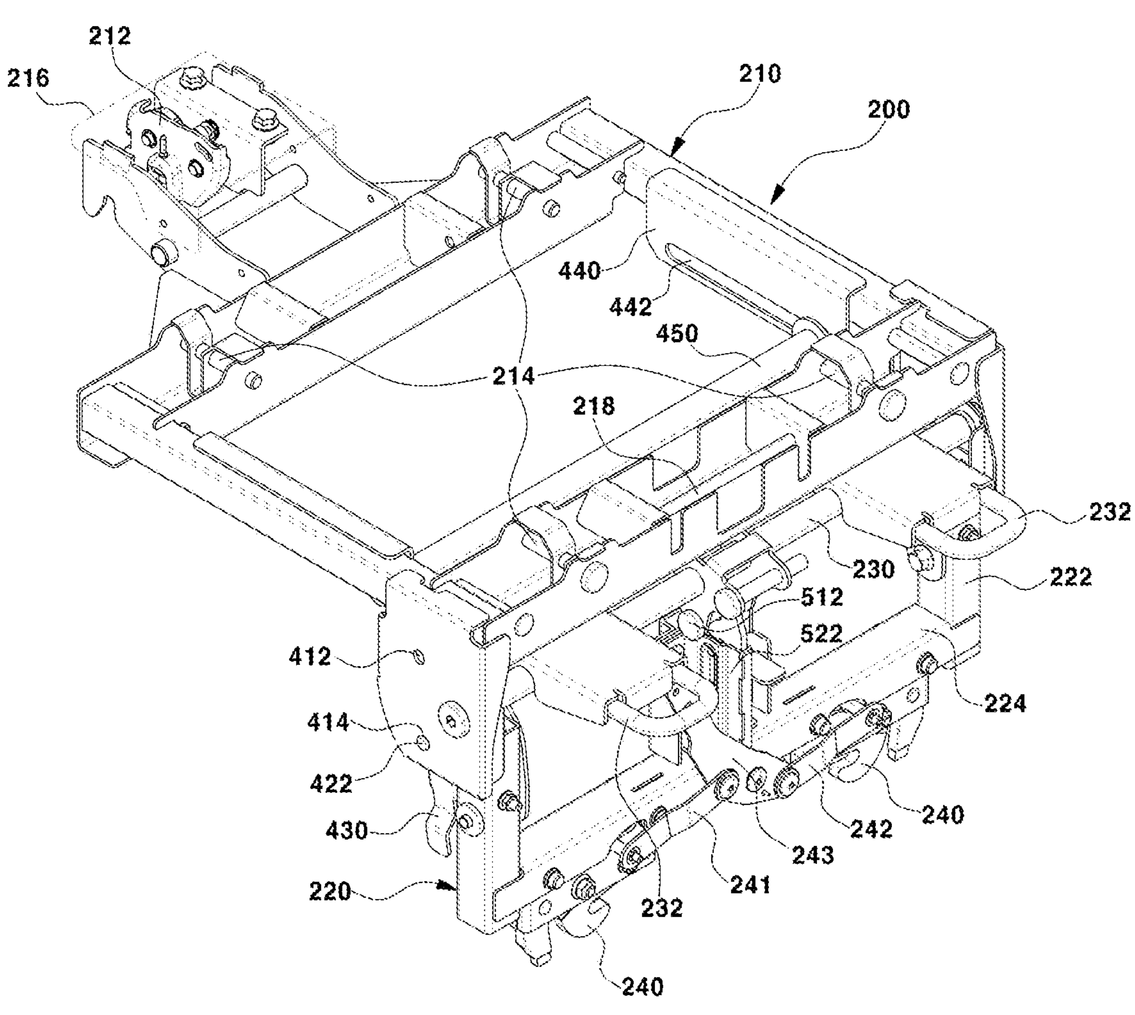
FIG. 3 is a perspective view showing a state of the leg frame, the lower latch, and the like are assembled together among the configurations of the seat mounting device for a vehicle according to the present disclosure.

Accompanying FIG. 1 is a perspective view showing a state in which a seat latch is mounted on a seat cushion frame among configurations of a seat mounting device for a vehicle according to the present disclosure, FIG. 2 is a perspective view showing a state in which a leg frame, a lower latch, and the like are separated from each other among the configurations of the seat mounting device for a vehicle according to the present disclosure, and FIG. 3 is a perspective view showing a state of the leg frame, the lower latch, and the like are assembled together among the configurations of the seat mounting device for a vehicle according to the present disclosure.

As shown in FIG. 1, seat latches 110 are respectively mounted at four corner positions of a seat cushion frame 100, which is a seat cushion skeleton of the seat.

For example, the seat latch 110 may be provided in the same structure as a known vehicle door latch.

A leg frame 200 may be detachably mounted on the seat latch 110 mounted on the seat cushion frame 100.

As shown in FIGS. 2 and 3, the leg frame 200 includes: an upper leg frame 210 on one side portion of which a side latch 212 is mounted and on upper surfaces of which upper strikers 214, to which the seat latches 110 are detachably fastened, are provided; a support shaft 230 mounted on an opposite side portion of the upper leg frame 210; and a lower leg frame 220 rotatably mounted on the support shaft 230.

In addition, a connection striker 218 for connecting no fewer than two rows of seats is mounted on the opposite side portion of the upper leg frame 210.

In addition, a pair of lower latches 240 is mounted on a lower portion of the lower leg frame 220.

For example, the side latch 212 mounted on the one side portion of the upper leg frame 200 and the lower latches 240 mounted on the lower leg frame 220 may be provided in the same structure as a known door latch for a vehicle.

Here, the lower leg frame 220 may include: a pair of vertical frames 222 rotatably fastened to the support shaft 230; and a horizontal frame 224 provided in a structure, which is mounted with the pair of lower latches 240, and configured to be connected between the pair of vertical frames 222.

Figure 4:
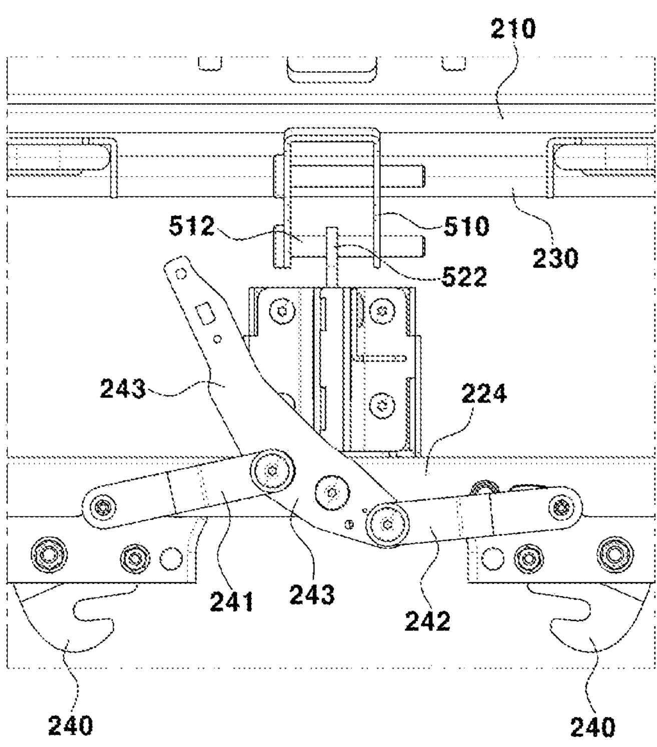
FIG. 4 is an enlarged view of main parts among the configurations of the seat mounting device for a vehicle according to the present disclosure, the main parts showing a state in which the lower latch release lever is connected to the lower latch.

With reference to FIG. 4, a first operating lever 241 and a second operating lever 242 are respectively connected to the pair of lower latches 240, a lower latch release lever 243 is hinge fastened to the horizontal frame 224 of the lower leg frame 220, and inner side ends of the first operation lever 241 and the second operation lever 242 are respectively hinge fastened to the lower latch release lever 243.

At this time, the inner side ends of the first operating lever 241 and the second operating lever 242 are respectively hinge fastened to an upper point and a lower point, which are at equal distances from a hinge point at which the lower end portion of the lower latch release lever 243 is hinge fastened to the horizontal frame 224.

Accordingly, when the lower latch release lever 243 is actuated to rotate in an unlocking direction, the first operation lever 241 and the second operation lever 242 are simultaneously pulled in the unlocking direction of the lower latches 240, so unlocking of the lower latches 240 may be established.

Figure 5:
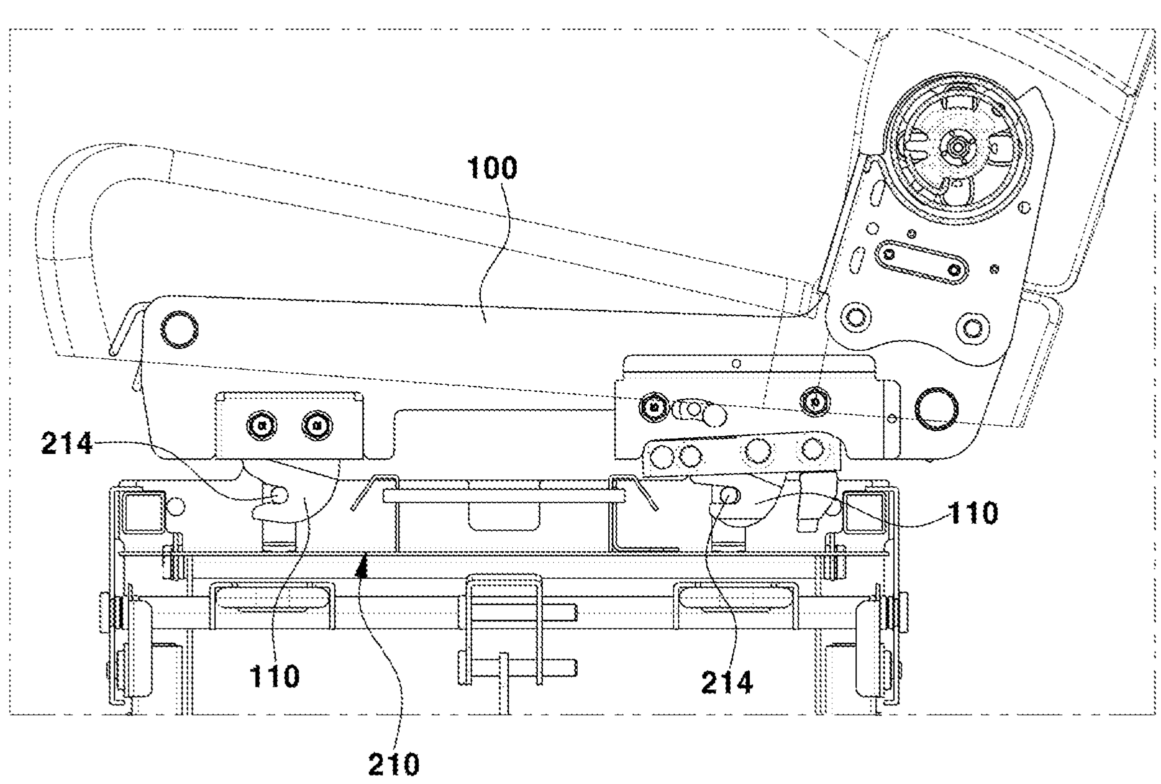
FIG. 5 is a side view showing a state in which the seat cushion frame and the leg frame are coupled with each other by the seat latches among the configurations of the seat mounting device for a vehicle according to the present disclosure.
Figure 6:
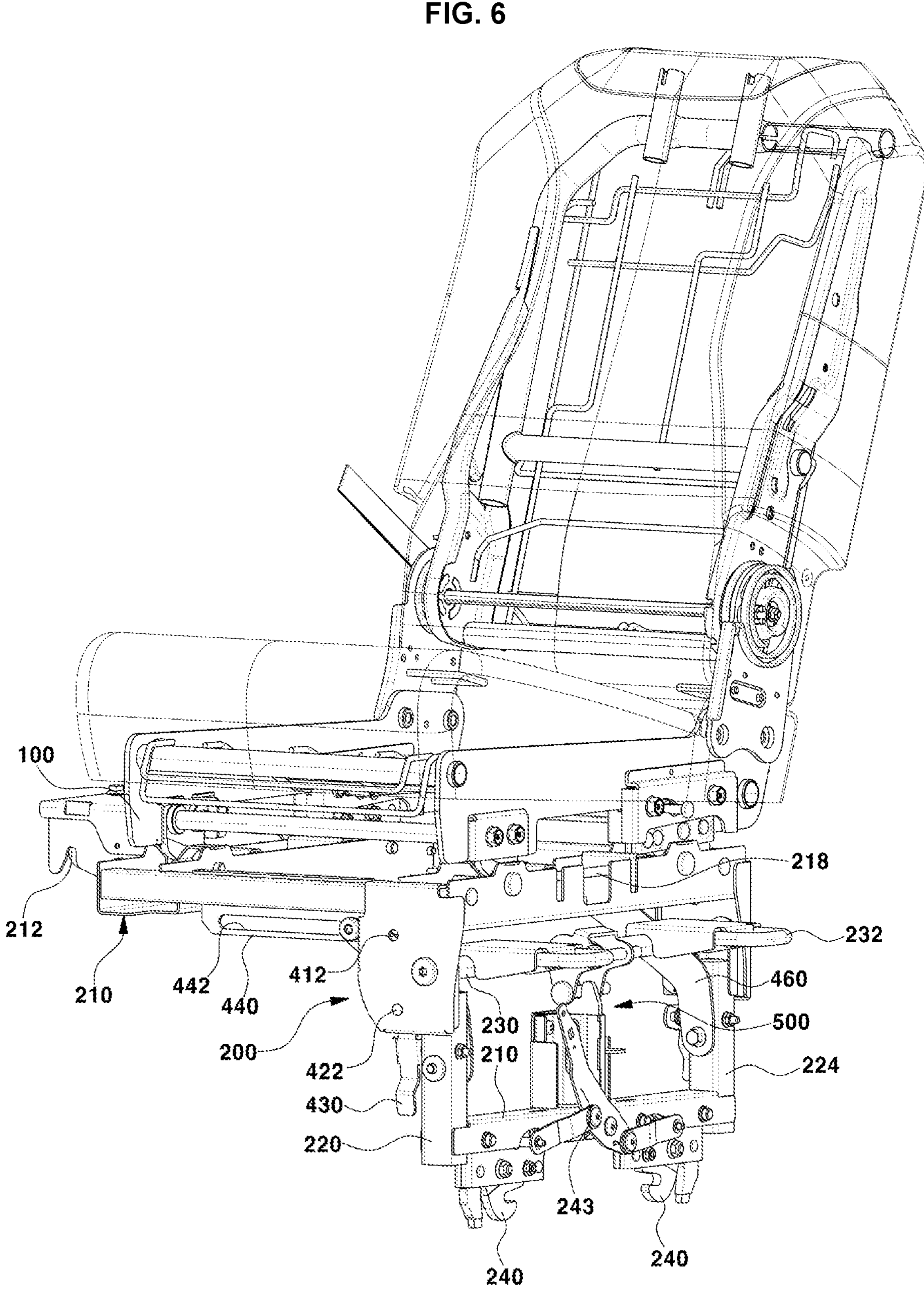
FIGS. 6 and 7 are perspective views each showing a state in which the seat cushion frame and the leg frame are coupled with each other by the seat latches among the configurations of the seat mounting device for a vehicle according to the present disclosure.
Figure 7:
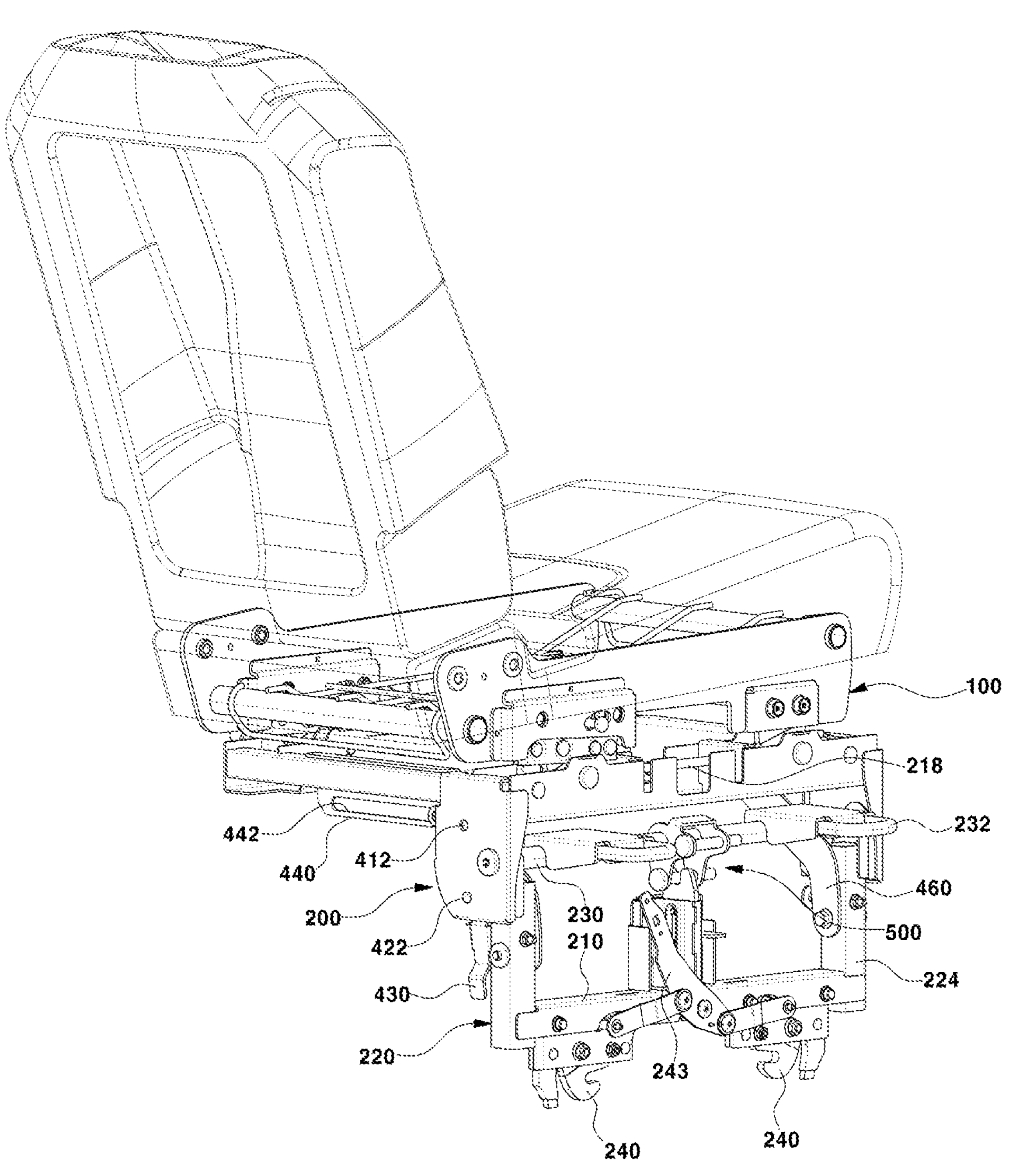
Figure 8:
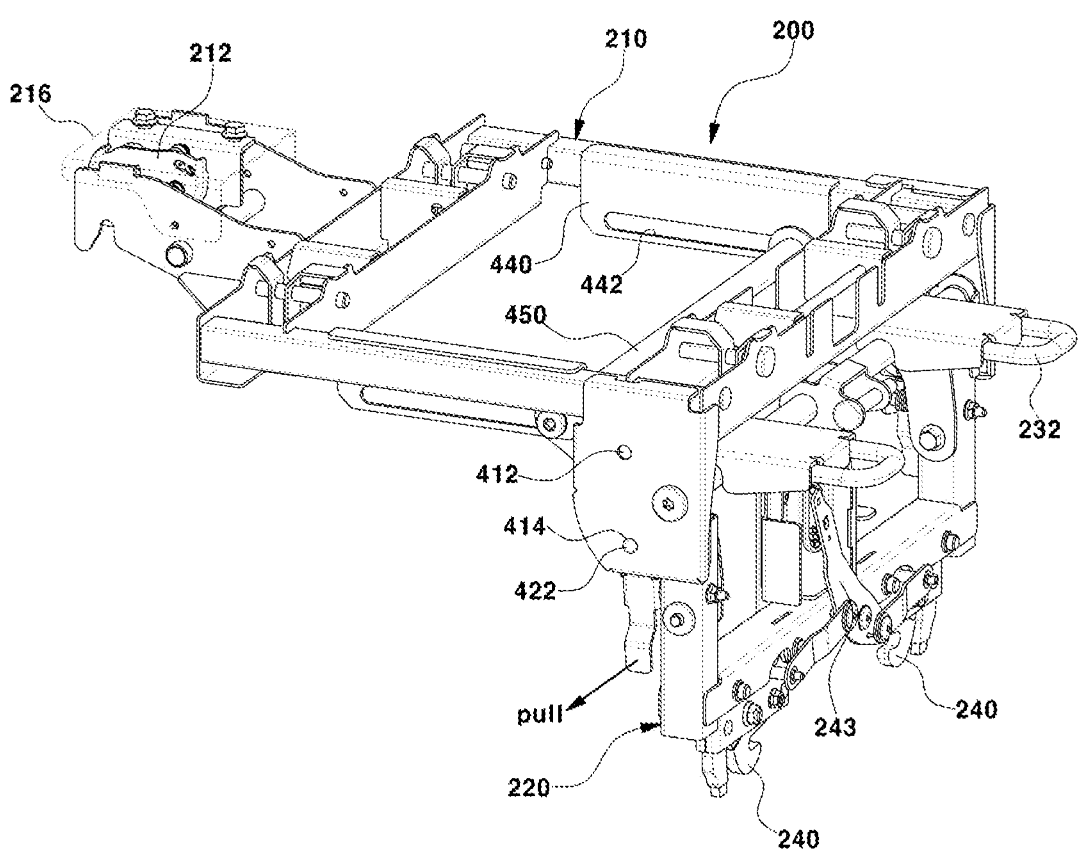
FIGS. 8 to 13 are diagrams sequentially showing a folding device and its folding operation sequences among the configurations of the seat mounting device for a vehicle according to the present disclosure.
Figure 9:
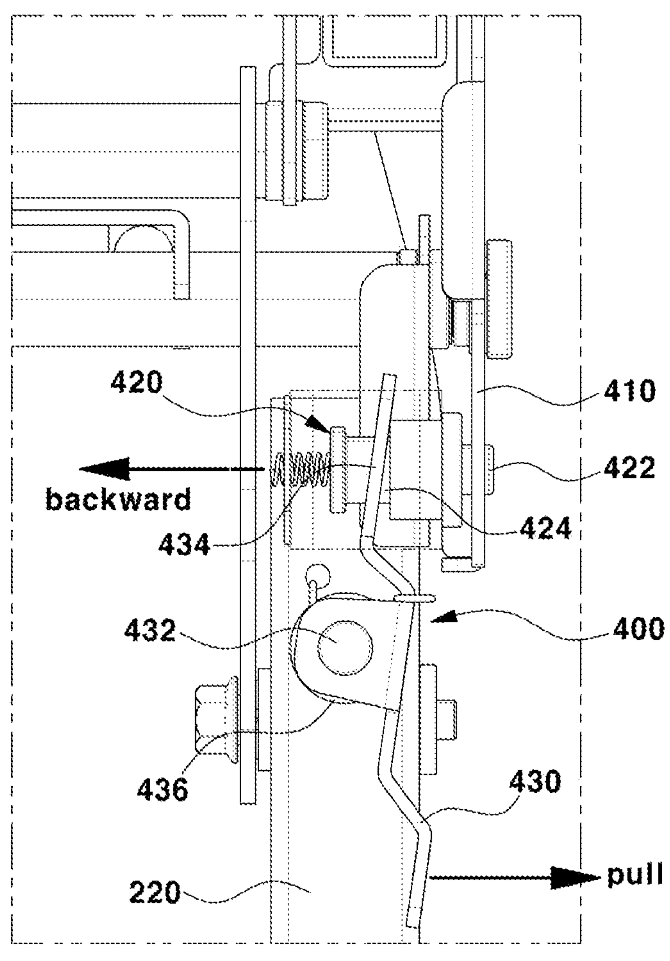

Accompanying FIGS. 5, 6, and 7 are views each showing a state in which the seat cushion frame and the leg frame are coupled to each other by the seat latches among the configurations of the seat mounting device for a vehicle according to the present disclosure, As shown in FIG. 5, the upper strikers 214 mounted on the upper leg frame 210 of the leg frame 200 are inserted to be fastened to the seat latches 110 mounted on the seat cushion frame 100, whereby the leg frame 200 is in a state of being assembled to a bottom portion of the seat cushion frame 100.

At this time, after arranging the seat to face forward as shown in FIG. 6, the upper strikers 214, mounted on the upper leg frame 210 of the leg frame 200, are inserted into and fastened in a locked manner to the seat latches 110, mounted on the seat cushion frame 100, whereby the seat may be arranged to face forward.

Alternatively, after arranging the seat to face rearward as shown in FIG. 7, the upper strikers 214, mounted on the upper leg frame 210 of the leg frame 200, are inserted into and fastened in a locked manner to the seat latch 110, mounted on the seat cushion frame 100, whereby the seat may be arranged to face rearward.

As shown above, the seats may be arranged to face forward or rearward, depending on a user's desired seat arrangement (for example, an arrangement where passengers seated in the front row of the seats and passengers seated in the rear row of the seats may face each other to talk).

Accompanying FIGS. 14 to 17 each show a state in which the leg frame is mounted on the support frame among the configurations of the seat mounting device for a vehicle according to the present disclosure.

Figure 14:
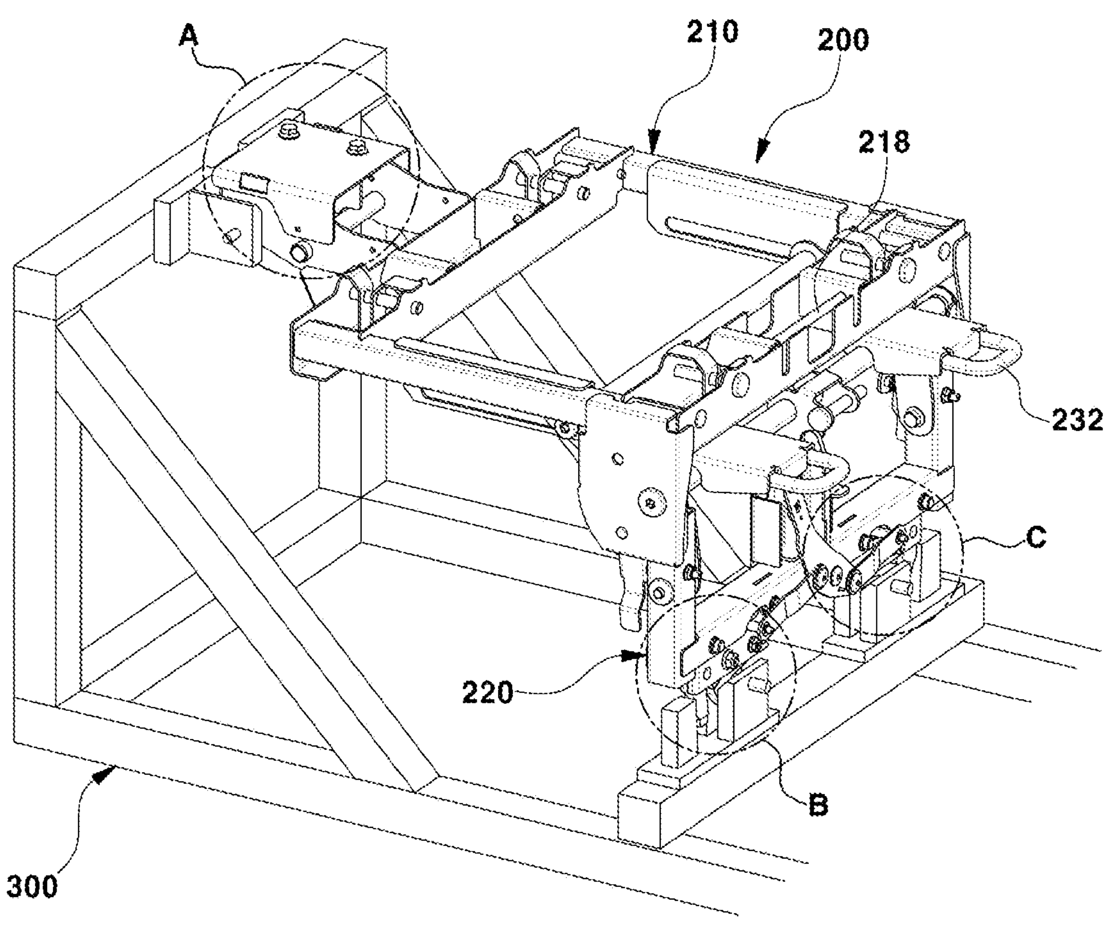
FIG. 14 is a perspective view showing a state in which the leg frame is mounted on the support frame among the configurations of the seat mounting device for a vehicle according to the present disclosure.

As shown in FIG. 14, the support frame 300 may be mounted on a vehicle body and provided in a structure, which has side strikers respectively mounted on opposite side portions and at least two lower strikers mounted on a lower portion.

Figure 15A:
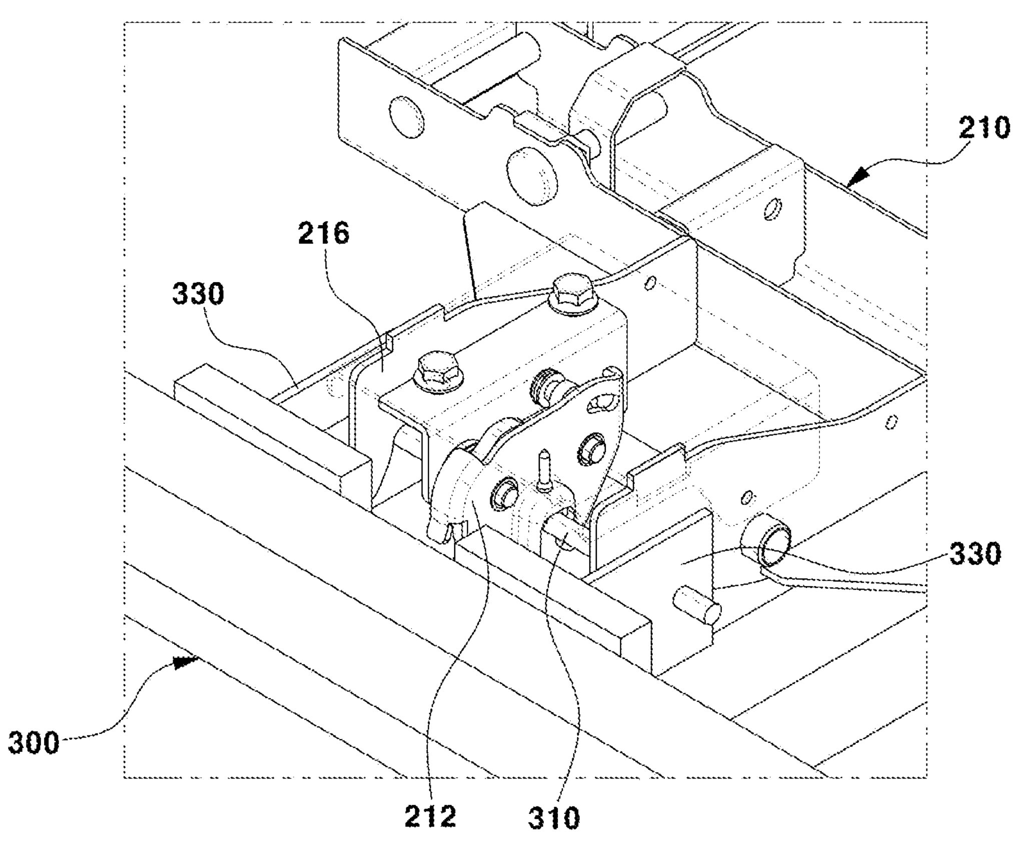
FIGS. 15A and 15B are enlarged perspective and plan views of part A of FIG. 14, respectively.
Figure 15B:
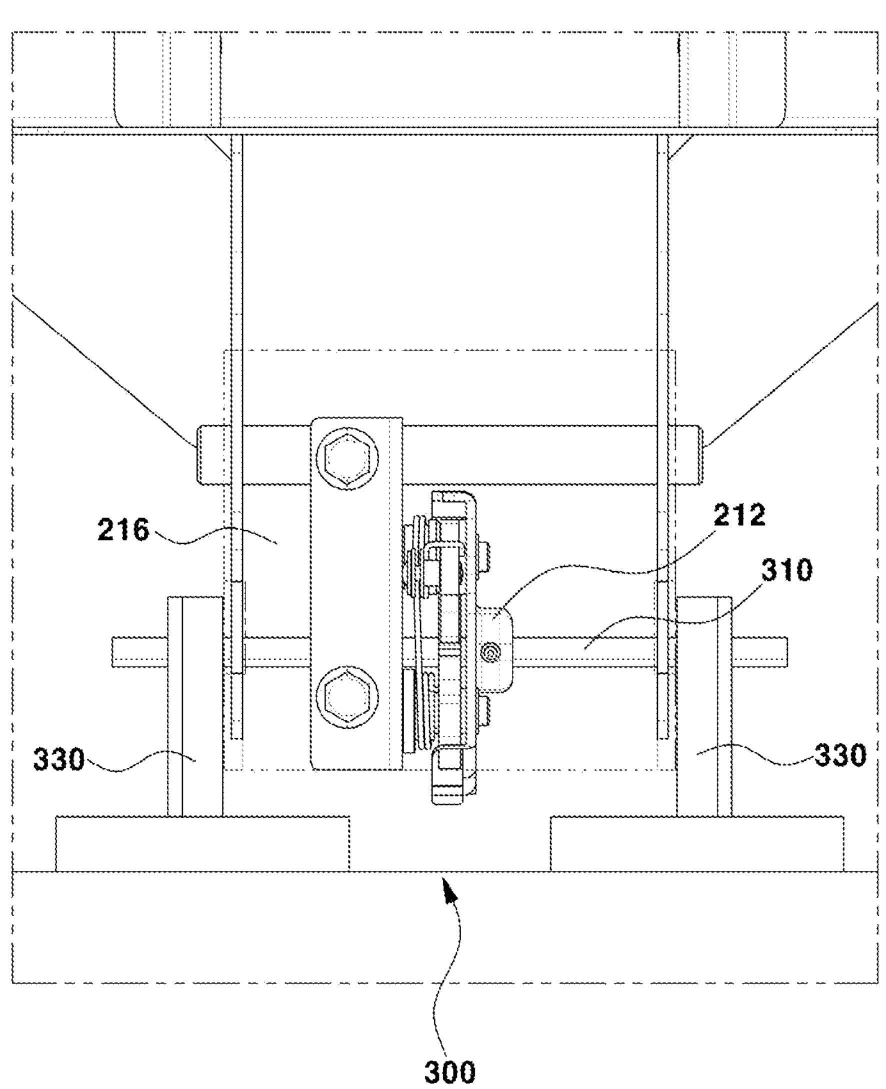
Figure 16:
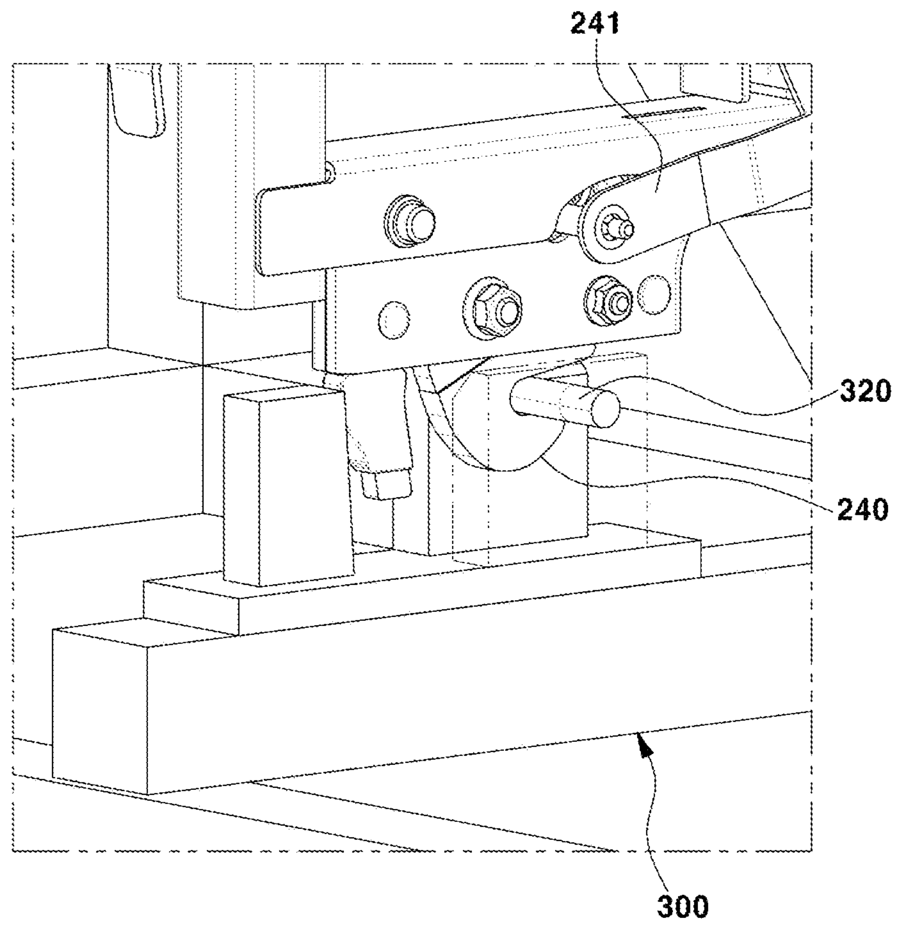
FIG. 16 is an enlarged perspective view of part B of FIG. 14.
Figure 17:
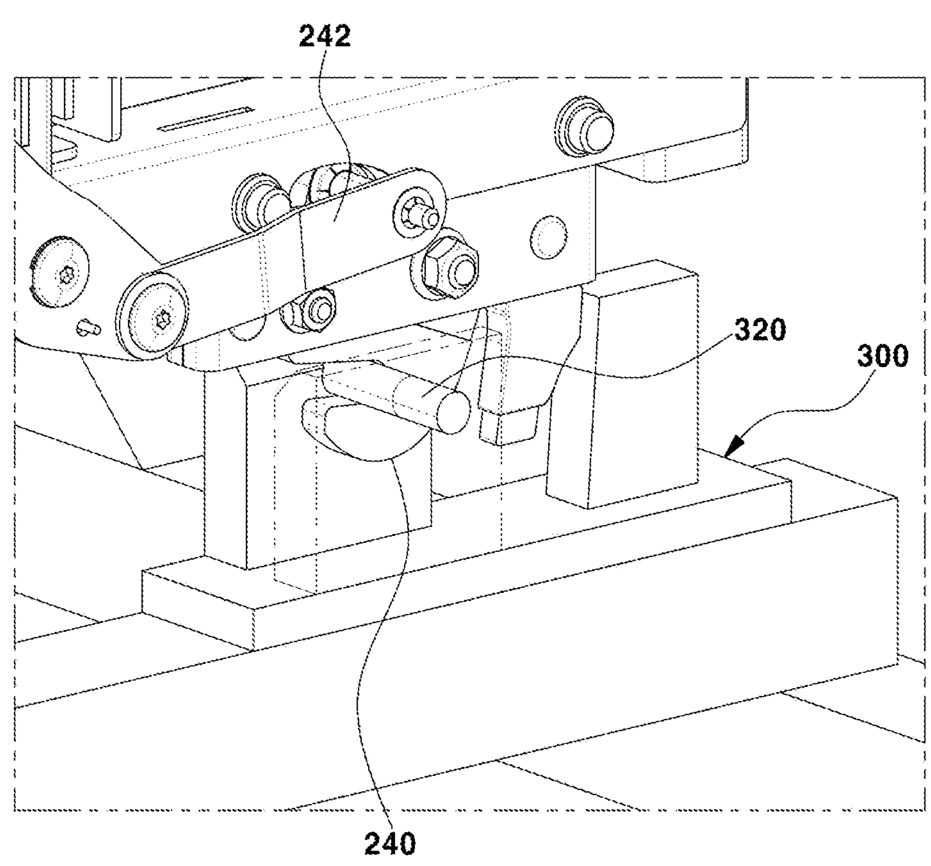
FIG. 17 is an enlarged perspective view of part C of FIG. 14.

Accordingly, as shown in FIGS. 15A and 15B, a side latch 212 mounted on one side portion of the upper leg frame 210 of the leg frame 200 may be detachably fastened to the side striker 310 of the support frame 300, and as shown in FIGS. 16 and 17, the lower latches 240 mounted on the horizontal frame 224 of the lower leg frame 220 may be detachably fastened to the lower strikers 320 of the support frame 300, respectively.

Here, the side latch 212, which is detachably fastened to the side striker 310 of the support frame 300, may be mounted in an open-bottom latch bracket 216 mounted on one side portion of the upper leg frame 210, thereby being in a state of being exposed to face downward.

In addition, as shown in FIGS. 15A and 15B, the support frame 300 is mounted with gap prevention brackets 330 that are fastened to opposite end portions of the side striker 310.

Accordingly, at the same time when the side latch 212 is fastened to the side striker 310, opposite side surfaces of the latch bracket 216 may respectively come into close contact with inner surfaces of the gap prevention brackets 330, whereby the side latch 212 and the leg frame 200 may be prevented from being moved toward front/back/left/right.

Meanwhile, the upper leg frame 210 and the lower leg frame 220 are mounted with a folding device 400 that is for allowing the lower leg frame 220 to be unfolded in a vertical direction or folded in a horizontal direction.

FIGS. 8 to 13 are diagrams sequentially showing a folding device and its folding operation sequences among the configurations of the seat mounting device for a vehicle according to the present disclosure.

The folding device 400 includes: a support plate 410 provided with an upper locking hole 412 and a lower locking hole 414; a locking block 420 provided with a locking pin 422 configured to be inserted into and fastened to one of the upper locking hole 412 and the lower locking hole 414; and a folding lever 430 for operating the locking block 420 to move forward and rearward.

The support plates 410 are each provided in a plate body structure with the upper locking hole 412 and the lower locking hole 414 and mounted at an anteroposterior position of the opposite side portion of the upper leg frame 210 in order to fix the opposite end portions of the support shaft 230.

The locking block 420 is provided in a structure with a locking pin 422 configured to be inserted into and fastened to one of the upper locking hole 412 and the lower locking hole 414 at one end portion and a connection groove 424 at an opposite end portion.

The folding lever 430 includes: an upper-end portion provided with an unlocking end 434 that is configured to be inserted into and fastened to the connection groove 424 of the locking block 420; a middle portion that is hinge fastened to the lower leg frame 220 by a hinge pin 432; and a lower-end portion in a state of being exposed to the outside to be allowed to be operated to pull.

At this time, between the middle part of the folding lever 430 and the hinge pin 432, a return spring 436, which is configured to exert an elastic restoring force in a direction opposite to a direction to pull the folding lever 430, is mounted.

Figure 12:
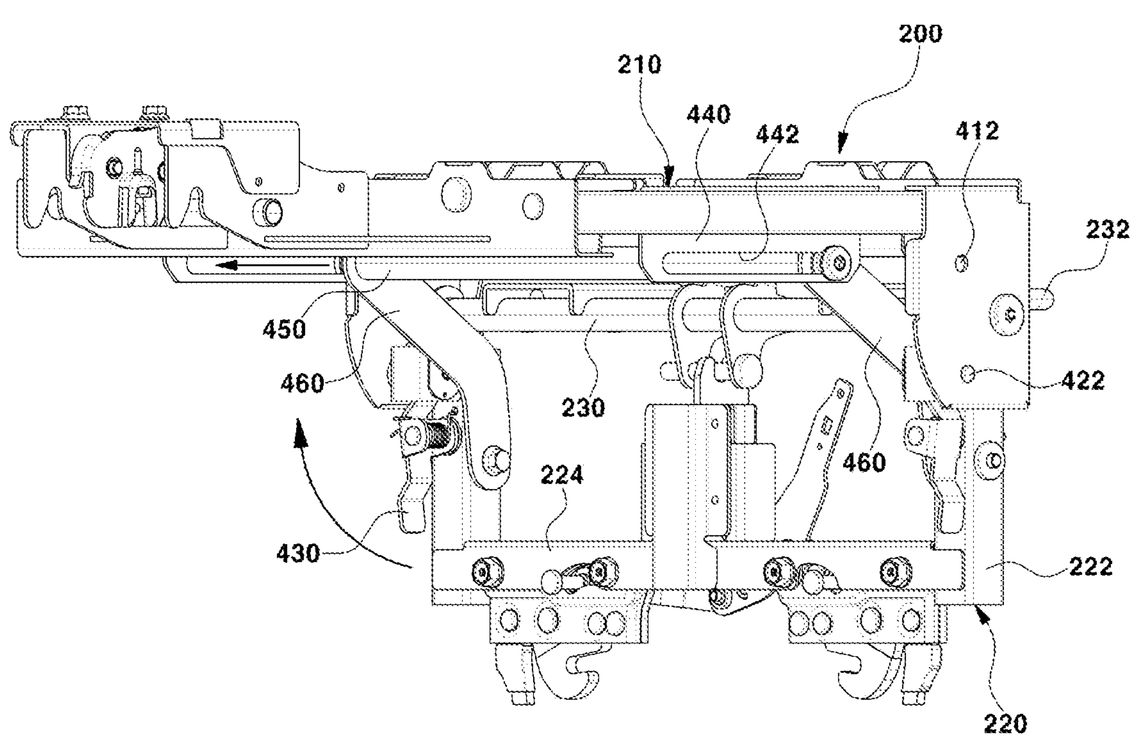

In addition, as may be seen well in FIGS. 2 and 12, the folding device further includes: a pair of guide brackets 440, each of which is provided with a long guide hole 442 and mounted on a lower surface portion of the upper leg frame 210 correspondingly; a guide pipe 450 with opposite end portions, each of which is configured to be slidably inserted into the guide hole 442 of a corresponding one of guide brackets 440; and a pair of guide links 460, each of which has one end portion that is configured to be connected to a corresponding one of the opposite end portions of the guide pipe 450 and an opposite end portion that is configured to be hinge fastened to an inner surface of a corresponding one of the vertical frames 222 of the lower leg frame 220.

Figure 10:
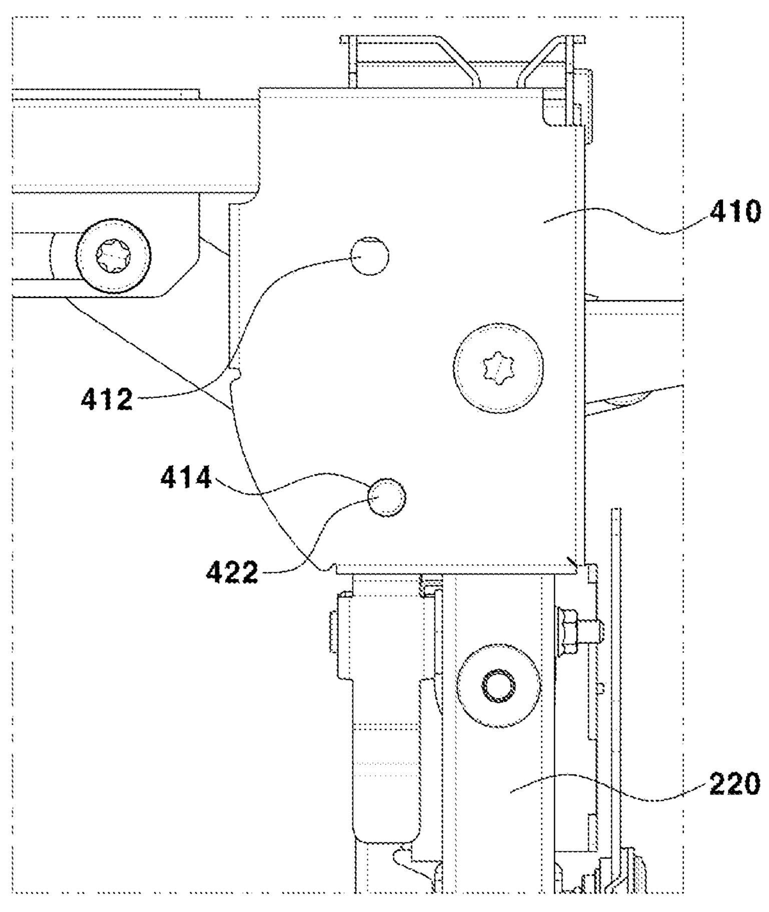
Figure 11:
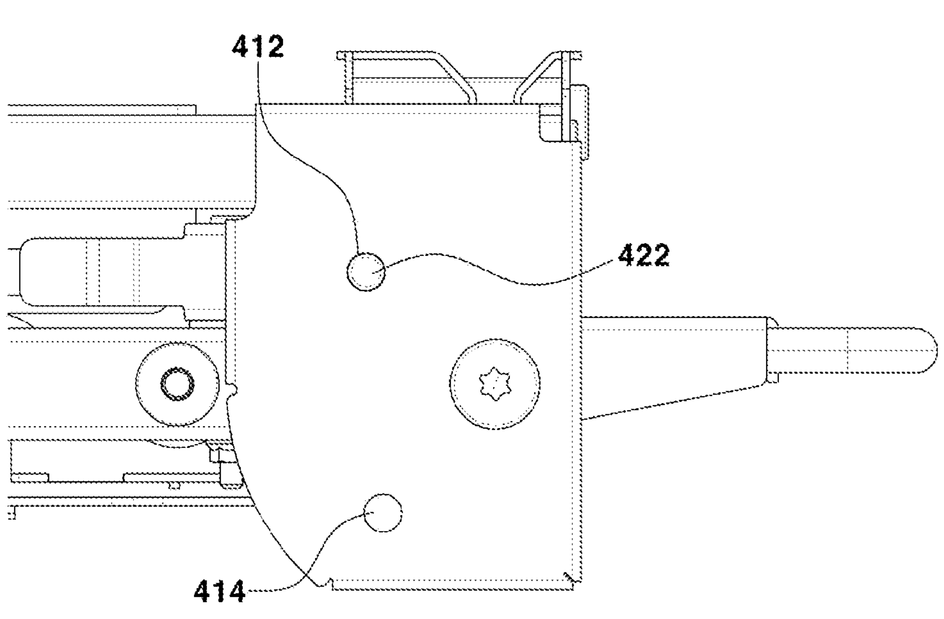
Figure 13:
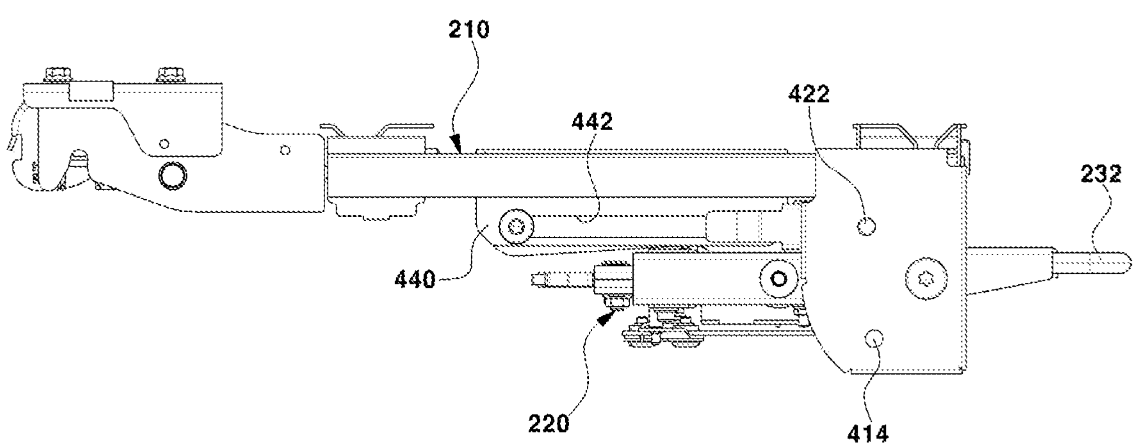

Therefore, at the position where the lower leg frame 220 is folded in the horizontal direction, the locking pin 422 of the locking block 420 may be inserted into and fastened to the upper locking hole 412 as shown in FIGS. 11 and 13 and, at the position where the lower leg frame 220 is unfolded in the vertical direction, may be inserted into and fastened to the lower lock hole 414 as shown in FIGS. 10 and 12.

To this end, when the lower end portion of the folding lever 430 is pulled in an outward direction, the unlocking end 434 may pull the locking block 420 in a rearward direction, and at the same time, the locking pin 422 may be separated from the upper locking hole 412 or the lower locking hole 414. Subsequently, the lower leg frame 220 is rotated to the folded or unfolded position, and then the locking pin 422 is inserted into and fastened to the upper locking hole 412 or the lower locking hole 414, whereby folding or unfolding of the lower leg frame 220 may be easily accomplished.

At this time, when the lower leg frame 220 is rotated to the folding position, the pair of guide links 460 push the guide pipe 450, and at the same time, the opposite end portions of the guide pipe 450 are slid in one direction along the guide holes 442. On the other hand, when the lower leg frame 220 is rotated to the unfolded position, the guide links 460 pull the guide pipe 450, and at the same time, the opposite end portions of the guide pipe 450 are slid in an opposite direction along the guide holes 442. Accordingly, the folding or unfolding operation of the lower leg frame 220 may be performed stably, and the folding or unfolding trajectory of the lower leg frame 220 may be guided regularly.

Meanwhile, there is a need to reinforce the rigidity of the lower leg frame 220 and the support shaft 230 and to disperse the load (for example, the weight of the center seat, the weight of the passenger, and the like), which is applied from the upper leg frame 210 and acted on the support shaft 230.

To this end, a locking device 500 for supporting and fixing the support shaft 230 is mounted between the horizontal frame 224 of the lower leg frame 220 and the support shaft 230.

As shown in FIGS. 2, 4, 12, and the like, the locking device 500 includes: a fixing bracket 510 mounted on the support shaft 230; a fixing pin 512 mounted on the fixing bracket 510; a locking bracket 520 mounted on the horizontal frame 224 of the lower leg frame 220; and a locking latch 522 mounted on the locking bracket 520 and locked and fastened to the fixing pin 512.

Accordingly, the locking latch 522 is fastened to the fixing pin 512 to support the fixing pin 512, and the fixing pin 512 is in a state of being integrally mounted on the support shaft 230 by the fixing bracket 510. Therefore, the locking latch 522 becomes in a state of supporting the support shaft 230, so support and the load distribution reinforcement for the support shaft 230 may be achieved.

Here, it will be looked at as an example of how seats may be assembled in a predetermined arrangement using the seat mounting device for a vehicle of the present disclosure, as described above.

Figure 18A:
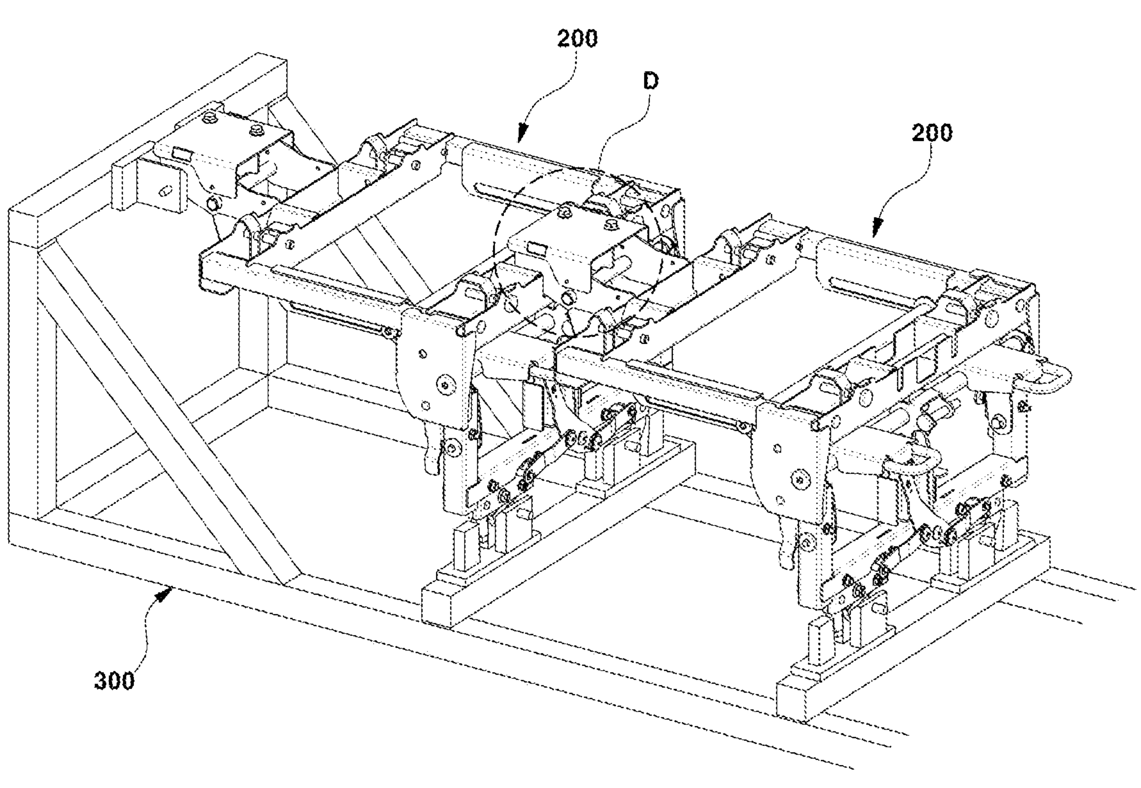
FIGS. 18A and 18B are perspective views each showing a state in which no fewer than two leg frames are successively assembled on the support frame among the configurations of the seat mounting device for a vehicle according to the present disclosure.
Figure 18B:
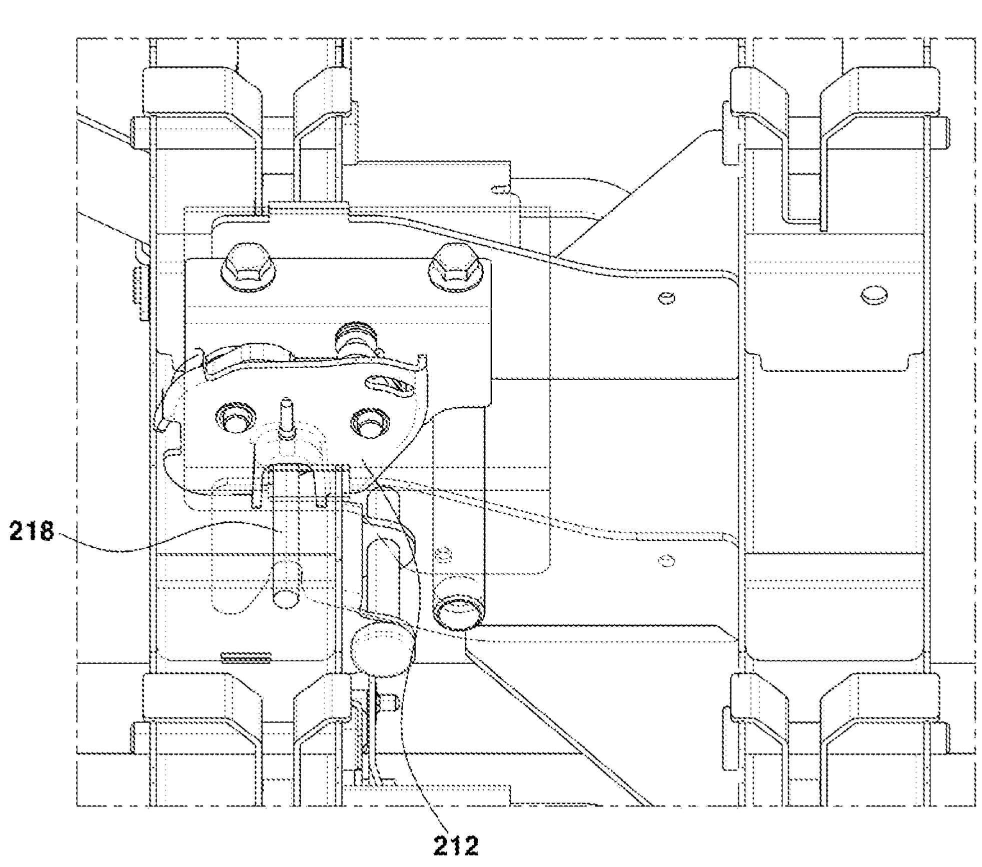
Figure 19:
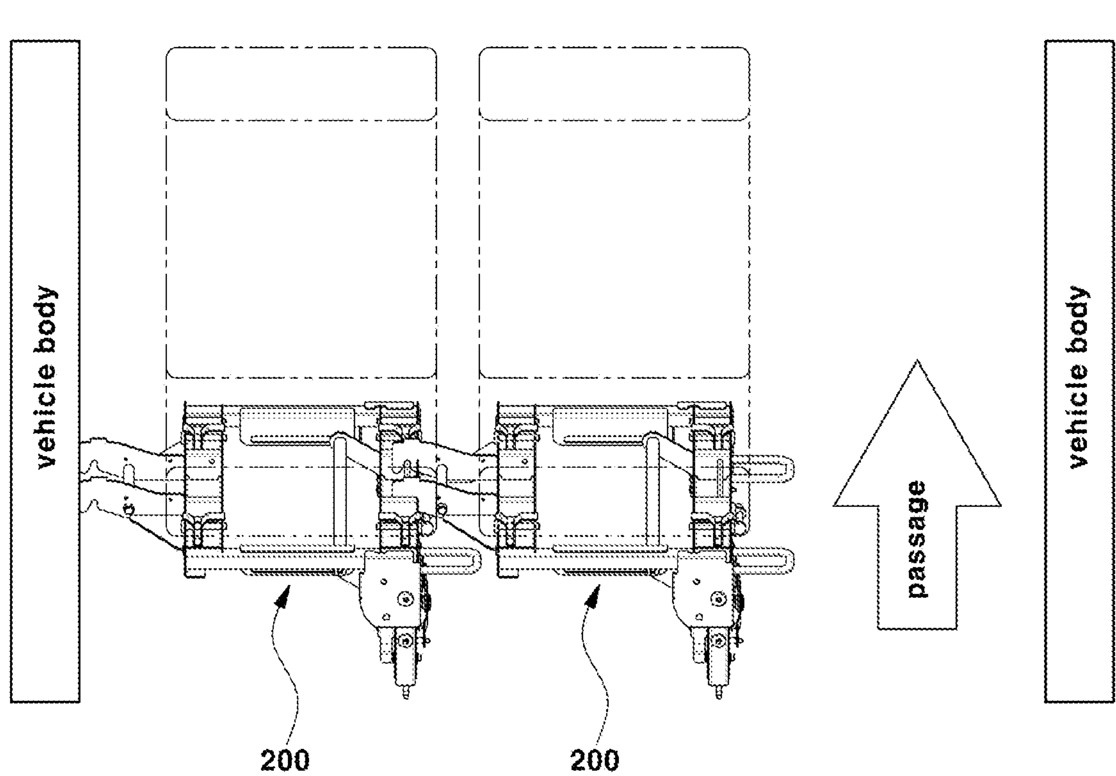
FIG. 19 is a diagram showing two seats mounted side by side while providing a passenger passage, with no fewer than two leg frames assembled into the support frame among the configurations of the seat mounting device for a vehicle according to the present disclosure.

Accompanying FIGS. 18A, 18B, and 19 each show a state in which no fewer than two frames are successively assembled on the support frame among the configurations of the seat mounting device for a vehicle according to the present disclosure.

In order to assemble no fewer than two seats side by side while providing a passenger passage, two leg frames 200 may be assembled consecutively as shown in FIGS. 18A and 18B.

To this end, the side latch 212 mounted on the one side portion of the upper leg frame 210 is fastened to the side striker 310 of the support frame 300, and the lower latches 240 mounted on the horizontal frame 224 of the lower leg frame 220 are respectively fastened to the lower strikers 320 of the support frame 300.

Subsequently, a side latch 212 mounted on one side portion of another upper leg frame 210 is fastened to the connection striker 218 mounted on the opposite side portion of the upper leg frame 210, and lower latches 240 mounted on a horizontal frame 224 of another lower leg frame 220 are respectively fastened to another lower strikers 320 of the support frame 300.

Next, the upper strikers 214 mounted on the upper leg frame 210 of each of the leg frames 200 are inserted into and fastened to the seat latches 110 mounted on the seat cushion frame 100 of each of the seats, whereby as shown in FIG. 19, the two seats are in a state of being assembled side by side while providing a passenger passage (for example, a passage through which passengers may pass between the second and third-row seats).

Accompanying FIGS. 20 to 23 are views each showing a state in which a seat cushion frame of a center seat is coupled to each of no fewer than two leg frames, which are mounted to be spaced apart from each other on the support frame, among the configurations of the seat mounting device for a vehicle according to the present disclosure.

Figure 20:
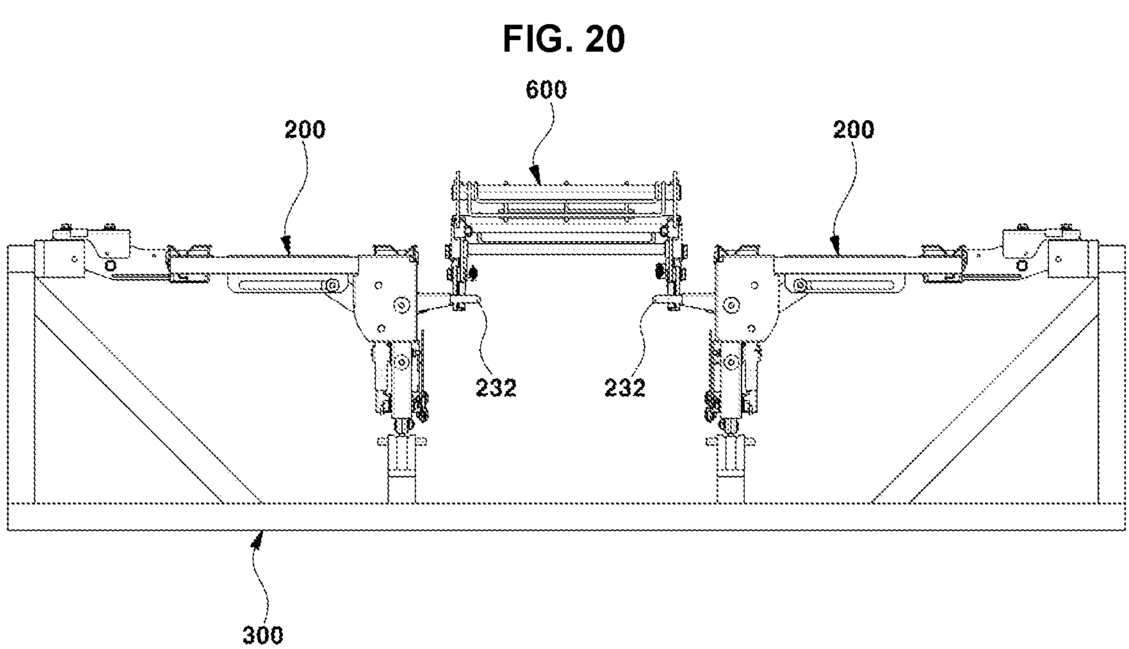
FIG. 20 is a front view showing a state in which, when no fewer than two leg frames are mounted to be spaced apart from one another on the support frame, a seat cushion frame of a center seat is coupled to each of two leg frames, among the configurations of the seat mounting device for a vehicle according to the present disclosure.

In order to assemble no fewer than three seats side by side, in a state in which no fewer than two leg frames 200 are mounted on the support frame 300 spaced apart from each other as shown in FIG. 20, a center seat may be further assembled between the two leg frames 200.

To this end, a pair of center strikers 232 for mounting the center seat is mounted on the support shaft 230, as shown in FIGS. 2, 6, and so on.

Figure 21:
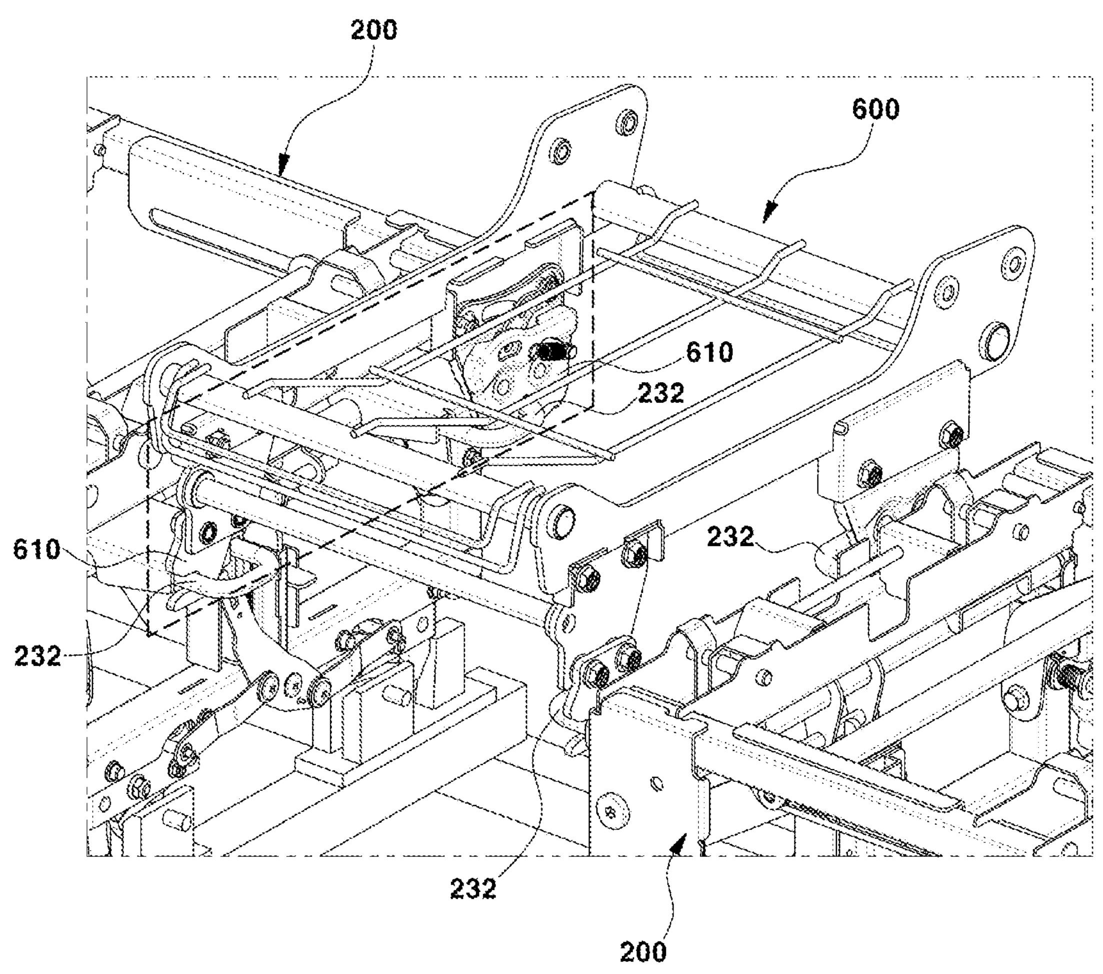
FIG. 21 is an enlarged perspective view of a main part showing a state in which, when no fewer than two leg frames are mounted to be spaced apart from one another on the support frame, the seat cushion frame of a center seat is coupled to each of two leg frames, among the configurations of the seat mounting device for a vehicle according to the present disclosure.
Figure 22:
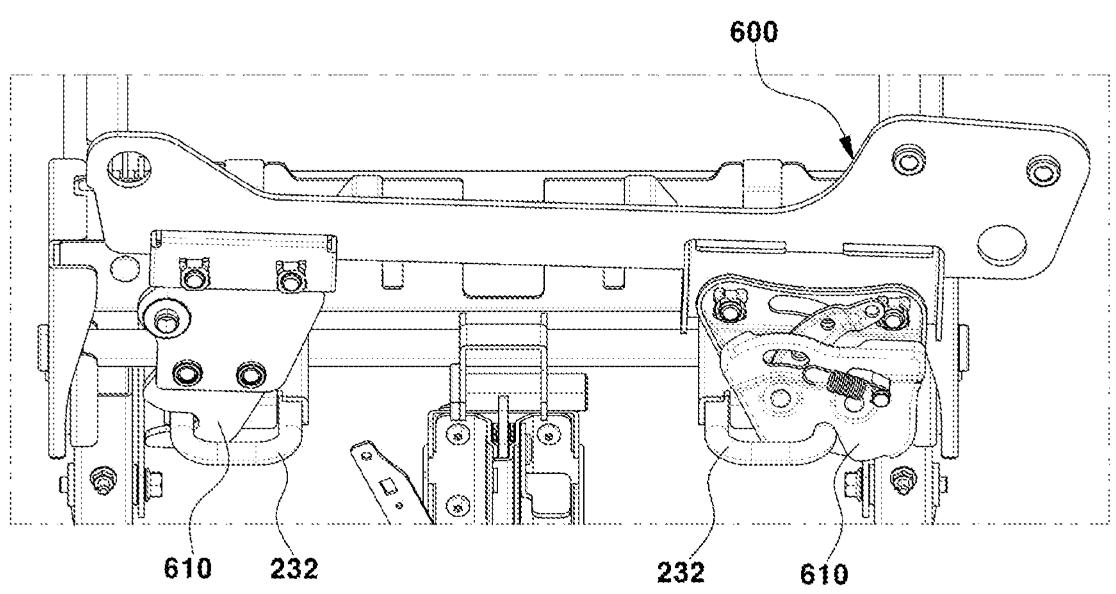
FIG. 22 is an enlarged view of part E of FIG. 21.

Accordingly, in a state in which no fewer than two leg frames 200 are mounted on the support frame 300 spaced apart from each other, as shown in FIGS. 21 and 22, a pair of center latches 610 respectively mounted on each of opposite sides of bottom portions of a center seat frame 600 is respectively fastened to the center strikers 232, resulting in a state in which the center seat frame 600 is further assembled between the two leg frames 200.

Figure 23:
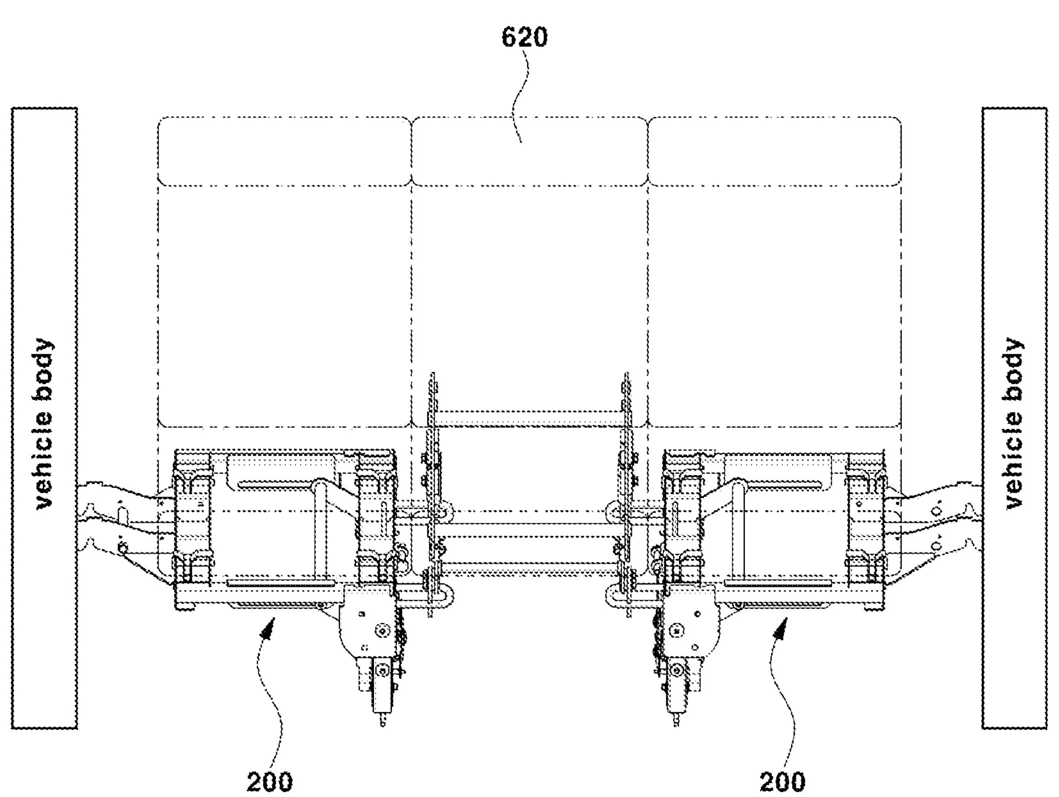
FIG. 23 is a schematic diagram showing an appearance in which, when no fewer than two leg frames are mounted to be spaced apart on the support frame, three seats are aligned side by side as the seat cushion frame of the center seat is coupled to each of the leg frames among the configurations of the seat mounting device for a vehicle according to the present disclosure.

Accordingly, as shown in FIG. 23, a center seat 620 having the center seat frame 600 as a skeleton may be further arranged between the left and right seats.

At this time, the locking latch 522 is in a state of supporting the fixing pin 512 and the support shaft 230 as described above, so even though a load (for example, a load of the center seat) is applied to the center striker 232 of the support shaft 230, the load may be easily distributed at the locking latch 522. Accordingly, the rigidity of the support shaft 230 may be maintained and the stable assembled state of the center seat may be maintained.

Figure 24:
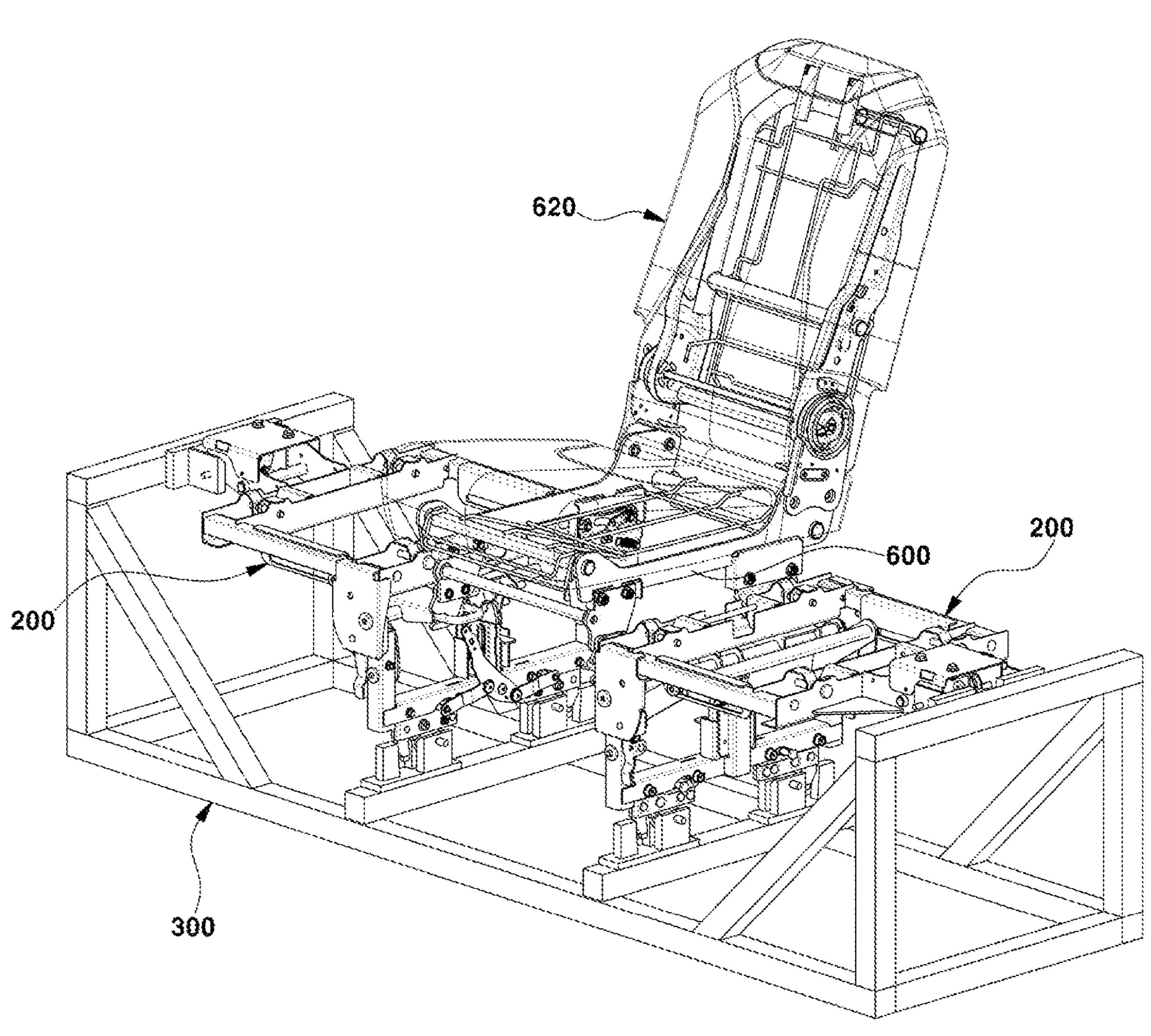
FIGS. 24 and 25 are perspective views each showing an example in which the center seat is mounted to face forward and an example in which the center seat is mounted to face rearward.
Figure 25:
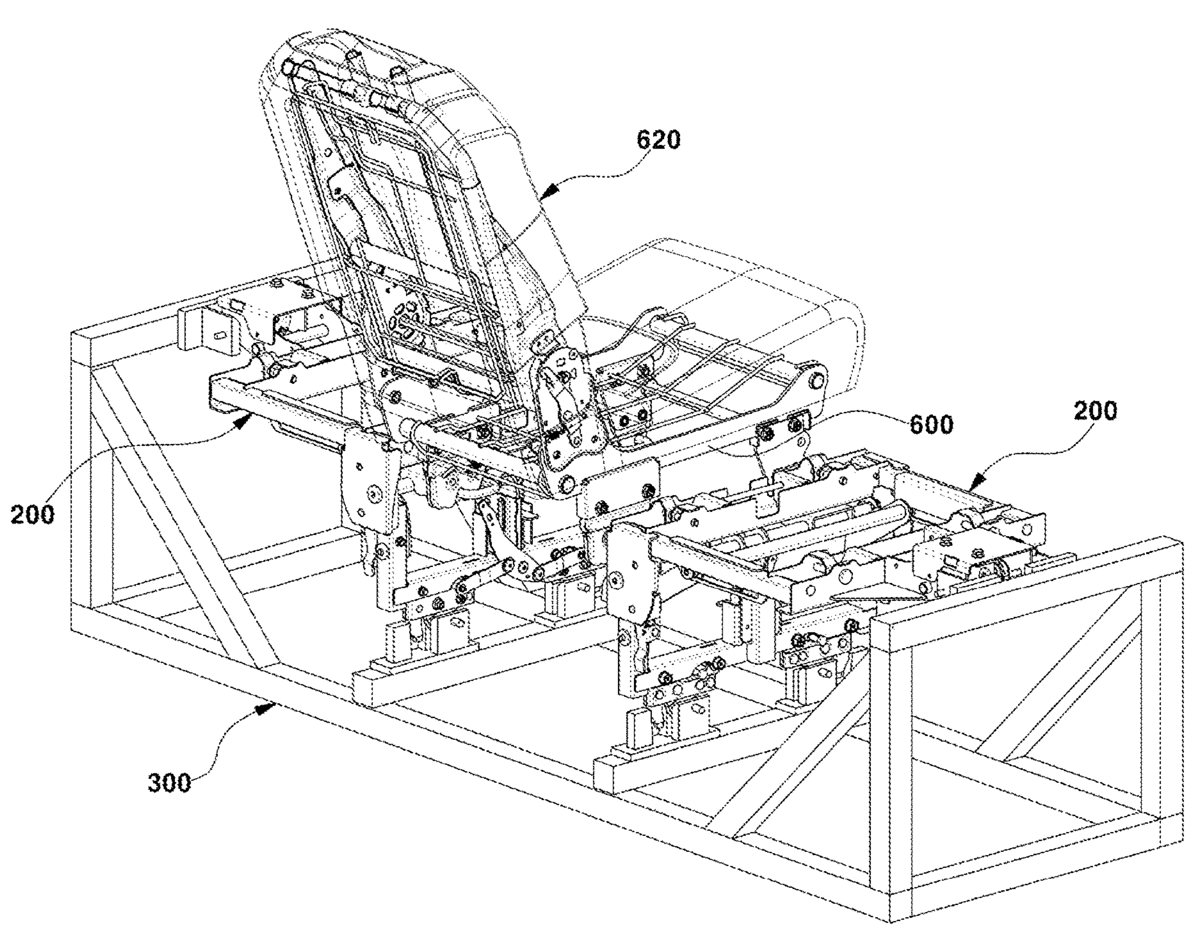

On the other hand, the center seat 620 having the center seat frame 600 as a skeleton may be assembled to face forward as shown in FIG. 24 and, after being removed again, may be assembled to face rearward as shown in FIG. 25.

Figure 26:
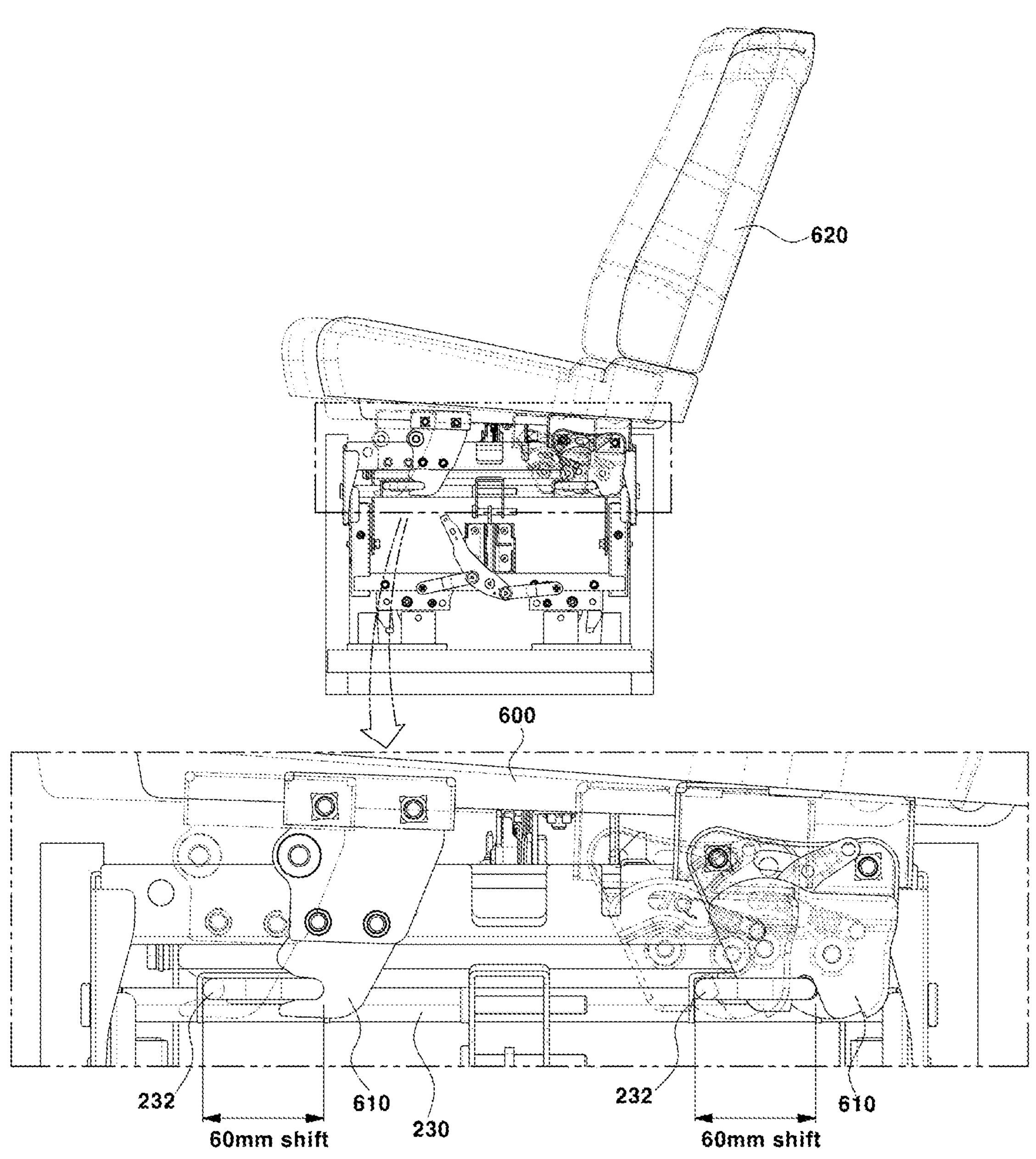
FIG. 26 is a schematic diagram showing an example in which the center seat is arranged to protrude forward compared to the left and right seats.

In addition, as shown in FIG. 26, out of the center latches 610 mounted on the bottom portion of the center seat frame 600, each of the center latches at a rear side may be fastened to a front ring portion, instead of a rear ring portion, of each of the center strikers 232 at a rear side, whereby the center seat 620, which has the center seat frame 600 as its skeleton, may be arranged to protrude forward compared to the left and right seats. Accordingly, an inconvenience of the shoulder of the passenger seated on the center seat 620 interfering with the shoulders of the passengers seated on the left and right seats may be resolved.

Meanwhile, the seat may be easily removed by separating the seat latches 110 mounted on the seat cushion frame 100 of each seat from the upper strikers 214 mounted on the upper leg frame 210 of each leg frame 200. In addition, the side latch 212 may be separated from the side striker 310, and simultaneously, the lower latches 240 may be separated from the lower strikers 320. Accordingly, the leg frame 200 may be easily removed from the support frame 300.

In this way, the seat can be removably mounted in an arrangement suited to the user's desired purpose within the vehicle, such as mounting the seat to face forward or rearward. Accordingly, the present disclosure may not only improve space utilization in the vehicle but also enable the seat to be removed from the leg frame and the leg frame to be removed from the support frame and folded. Consequently, the seat and leg frame may be easily stored in a separate storage location, and a large interior loading space in the vehicle may be secured accordingly.

Although the present disclosure has been described in detail as an embodiment above, the scope of the present disclosure is not limited to the above-described embodiment. In addition, various modifications and improvements made by those skilled in the art using the basic concept of the present disclosure defined in the following patent claims will also be included in the scope of rights of the present disclosure.

What is claimed is:

1. A seat mounting device for a vehicle, the seat mounting device comprising:
- a plurality of seat latches;
- a support frame having side strikers respectively mounted on opposite sides of the support frame and at least two lower strikers mounted on the support frame;
- a leg frame including:
  - an upper leg frame having a side latch, which is detachably fastened to the side striker, the upper leg frame having upper strikers, and a connection striker mounted on the upper leg frame;
  - a support shaft mounted on the upper leg frame; and
  - a lower leg frame rotatably mounted on the support shaft; and
- a pair of lower latches mounted on the lower leg frame and configured to be detachably fastened to the lower strikers, respectively.

2. The seat mounting device of claim 1, wherein the support shaft is mounted with a pair of center strikers for mounting a center seat.

3. The seat mounting device of claim 1, wherein the lower leg frame comprises:
- a pair of vertical frames rotatably fastened to the support shaft; and
- a horizontal frame mounted with the pair of lower latches and configured to be connected between the pair of vertical frames.

4. The seat mounting device of claim 3, wherein a locking device for supporting and fixing the support shaft is mounted on the horizontal frame of the lower leg frame and the support shaft.

5. The seat mounting device of claim 4, wherein the locking device comprises:
- a fixing bracket mounted on the support shaft;
- a fixing pin mounted on the fixing bracket;
- a locking bracket mounted on the horizontal frame; and
- a locking latch mounted on the locking bracket and locked and fastened to the fixing pin.

6. The seat mounting device of claim 3, wherein a first operating lever and a second operating lever are connected to the pair of lower latches, respectively, and a lower latch release lever, while being hinge fastened to each of inner side ends of the first operating lever and the second operating lever, is hinge fastened to the horizontal frame of the lower leg frame.

7. The seat mounting device of claim 6, wherein the inner side ends of the first operating lever and the second operating lever are respectively hinge fastened to an upper point and a lower point, which are at equal distances from a hinge point at which the lower latch release lever is hinge fastened to the horizontal frame.

8. The seat mounting device of claim 1, wherein the upper leg frame and the lower leg frame are mounted with a folding device configured to allow the lower leg frame to be unfolded in a vertical direction or to be folded in a horizontal direction.

9. The seat mounting device of claim 8, wherein the folding device comprises:
- a pair of support plates, each of which is configured to be a plate body structure provided with an upper locking hole and a lower locking hole and is mounted on the upper leg frame so as to allow one of opposite ends of the support shaft to be fixed correspondingly;
- a locking block provided with a locking pin, which is configured to be inserted into and fastened to one of the upper locking hole and the lower locking hole, provided on one end and a connection groove provided on an opposite end; and
- a folding lever including:
  - an unlocking end configured to be fastened to the connection groove of the locking block;
  - a middle structure configured to be hinge fastened to the lower leg frame by a hinge pin; and
  - a lower-end structure that is exposed to the outside to allow an operation to pull.

10. The seat mounting device of claim 9, wherein, between the middle structure of the folding lever and the hinge pin, a return spring, which is configured to exert an elastic restoring force in a reverse direction of pulling the folding lever, is mounted.

11. The seat mounting device of claim 9, wherein, in a position where the lower leg frame is folded, the locking pin of the locking block is inserted into the upper locking hole, and in a position where the lower leg frame is unfolded, the locking pin of the locking block is inserted into the lower locking hole.

12. The seat mounting device of claim 9, wherein, when the lower-end structure of the folding lever is pulled outward so that the lower leg frame may be rotated to the unfolded or folded position, the unlocking end pulls the locking block in a rearward direction, and at the same time, the locking pin is separated from the upper locking hole or the lower locking hole.

13. The seat mounting device of claim 9, wherein the folding device further comprises:
- a pair of guide brackets, each being provided in a structure with a guide hole and mounted on the upper leg frame correspondingly;
- a guide pipe with opposite ends, each of which is configured to be slidably inserted into the guide hole of a corresponding one of guide brackets; and
- a pair of guide links, each of which has one end that is configured to be connected to a corresponding one of the opposite ends of the guide pipe and an opposite end that is configured to be hinge fastened to an inner surface of a corresponding one of the vertical frames of the lower leg frame.

14. The seat mounting device of claim 1, wherein the side latch, which is detachably fastened to the side striker of the support frame, is mounted in an open-bottom latch bracket mounted on the upper leg frame.

15. The seat mounting device of claim 14, wherein the support frame is mounted with gap prevention brackets that are configured to be fastened to the side striker, and at the same time when the side latch is fastened to the side striker, opposite side surfaces of the latch bracket respectively come into close contact with inner surfaces of the gap prevention brackets.

16. The seat mounting device of claim 1, wherein the seat latches are mounted on a bottom of a seat cushion frame.

17. The seating mounting device of claim 1, wherein the support frame is mounted on a vehicle body of the vehicle.

18. The seat mounting device of claim 1, wherein the upper leg frame includes upper strikers mounted on upper surfaces of the upper leg frame.

19. The seat mounting device of claim 18, wherein the connection striker is mounted on an opposite side of the upper leg frame from the upper strikers.

20. A vehicle comprising the seat mounting device of claim 1.

* * * * *